(12) United States Patent
Shin

(10) Patent No.: US 7,712,497 B2
(45) Date of Patent: May 11, 2010

(54) ANTI-SLIPPING DEVICE FOR DUAL TIRES

(75) Inventor: Dae Kyun Shin, Seoul (KR)

(73) Assignee: SCS Systems Co., Ltd., Seoul (KR)

( * ) Notice: Subject to any disclaimer, the term of this patent is extended or adjusted under 35 U.S.C. 154(b) by 0 days.

(21) Appl. No.: 12/113,498

(22) Filed: May 1, 2008

(65) Prior Publication Data

US 2008/0271828 A1     Nov. 6, 2008

(30) Foreign Application Priority Data

May 1, 2007     (KR) .................... 10-2007-0042348

(51) Int. Cl.
    *B60C 11/00*     (2006.01)
(52) U.S. Cl. .................. 152/220; 152/213 R
(58) Field of Classification Search ............. 152/213 R, 152/216–217, 219–222, 225 R, 226–230
    See application file for complete search history.

(56) References Cited

U.S. PATENT DOCUMENTS

| | | | |
|---|---|---|---|
| 1,127,744 A | | 2/1915 | Dugan |
| 1,147,470 A | | 7/1915 | Weed |
| 1,324,495 A | | 12/1919 | Cleaver |
| 2,263,542 A | * | 11/1941 | Keiling et al. ............... 152/220 |
| 2,858,871 A | * | 11/1958 | Kinnucan .................... 152/220 |
| 2,936,807 A | | 5/1960 | Hajart |
| 3,103,242 A | | 9/1963 | Culp |
| 3,581,797 A | * | 6/1971 | Kinnucan .................... 152/220 |
| 3,696,852 A | * | 10/1972 | Oulman ....................... 152/220 |
| 3,735,789 A | * | 5/1973 | Landerer et al. ............. 152/217 |
| 4,854,359 A | | 8/1989 | Ippen et al. |
| 6,543,501 B2 | * | 4/2003 | Ferreira ................... 152/225 R |
| 6,581,661 B1 | | 6/2003 | Morrison et al. |
| 6,725,894 B2 | | 4/2004 | Clark |
| 2009/0050249 A1 | * | 2/2009 | Shin ........................ 152/213 R |

FOREIGN PATENT DOCUMENTS

| | | |
|---|---|---|
| JP | 9-323516 | 12/1997 |
| KR | 20-0289488 | 9/2002 |
| KR | 20-0409628 | 2/2006 |
| KR | 200424423 | * 8/2006 |

* cited by examiner

*Primary Examiner*—Jason R Bellinger
(74) *Attorney, Agent, or Firm*—The Webb Law Firm

(57)     ABSTRACT

Provided is an anti-slipping device for dual tires including: a plurality of spike members 100 which comprises an insertion plate 110 bent in a trapezoidal shape to be inserted between the dual tires, and close-contact plates 120 integrally extending from opposite sides of the insertion plate 110 to closely contact each surface of the dual tires; a belt 200 connecting the insertion plates 110 of the plurality of spike members 100 to each other; and a fastener 300 coupled to opposite ends of the belt 200 to adjust tension of the belt, wherein the fastener 300 includes first and second connection rings 330*a* and 330*b* each inserted into insertion space parts 201*a* and 210*b* formed at both ends of the belt 200, and a belt fastener 340 detachably coupled to the first and second connection rings 330*a* and 330*b* to adjust tension of the belt 200, thereby stably providing running performance and braking power to minimize a risk of a slipping accident.

18 Claims, 22 Drawing Sheets

ANTI-SLIPPING DEVICE FOR DUAL TIRES

BACKGROUND OF THE INVENTION

1. Field of the Invention

The present invention relates to an anti-slipping device for dual tires, and more particularly, to an anti-slipping device for dual tires used as a rear wheel of a large car, in which a plurality of spike members connected by a belt are inserted between the dual tires at regular intervals, and opposite ends of the belt are tightly fastened together by a fastener, thereby stably providing running performance and braking power to minimize a risk of a slipping accident.

2. Description of the Related Art

In general, a chain, an integral chain that cables or urethane blocks are interconnected, a snow-tread tire, a spike tire, etc. are prepared for a snowy or icy road.

In the case of the chain or integral chain, they damage the road surface and make a pothole on the road, so that use of the chain or integral chain is restricted on expressways to prevent an accident due to the pothole from happening.

Further, a mounting work of the chain or integral chain is very complicated and difficult, for example, the wheel should be rotated forward and backward for mounting them thereon. It is difficult for even a burly man to normally and tightly mount the chain on the wheel on a cold winter's day. Thus, the chain may be broken away from the wheel or lost while running, thereby causing an accident. Also, the chain may be so damaged that it cannot be reused.

Meanwhile, if the chain or integral chain is mounted on an inside tire of dual tires, the mounting work is allowed under the condition that the dual tires are all taken out from a vehicle or the vehicle is jacked up. Further, the chain should be intertwined on the whole surface of the tire, so that it takes at least 30 minutes to 1 hour to mount the chain on the wheel. The chain itself tips the scales at 50 kg×2=100 kg, and the trip distance cannot exceed 100 km.

In the case of the snow tire or spike tire, it is difficult to quickly replace a normal tire with the snow or spike tire on the road according to sudden weather changes, so that a user has to drive the vehicle dangerously in order to take the vehicle to a garage. Also, the snow and spike tires are relatively expensive and decrease fuel efficiency, so that they are not economical.

To solve these problems, an idea such as a pad-type snow chain which is connected in a straight line has been proposed, but there are many problems to apply it to a practical vehicle. If the straight-line connection pad is applied to the vehicle, it increases a risk of an accident in comparison the existing chain.

For example, abrasion resistance of a saw-tooth provided in the pad is bad, so that the saw-tooth is easily abraded by running of about 20~30 km. Thus, this pad cannot be used as the snow chain. Further, a contact rate between the saw-tooth spike and the road is so high that it runs afoul of the law.

Further, a curved angle of the pad closely-attached between the dual tires is so large that the close-contact between the pad and the tire is inferior if a space between the dual tires is narrow, thereby damaging the tires or breaking the chain.

Also, when the chain is fastened at the last stage of the mounting work, a fastener is unstable and causes the chain to be easily loosed or broken during running. Due to such problems, the straight-line connection pad requires a lot of complements so as to be applied to the practical vehicle.

SUMMARY OF THE INVENTION

First, the present invention is directed to an anti-slipping device for dual tires, in which double spikes that are different in height protrude from an outer surface of a spike member, i.e., a contact surface in contact with a road surface, so that the double spikes are prevented from abrasion and thus semipermanently usable, thereby minimizing road damage and increasing friction between the tire and the road surface to enhance braking power.

Second, the present invention is directed to an anti-slipping device for dual tires, in which a close-contact plate of a spike member is inclined at a predetermined angle to closely contact each surface of the dual tires, so that close-contact between the device and the tire increases to thereby prevent the wheel from idling and enhance driving comfort.

Third, the present invention is directed to an anti-slipping device for dual tires, in which an outer surface of a spike member, i.e., a contact surface in contact with a road surface is formed with at least one curved part, so that contact between a circumferential area of the spike member and the road surface is minimized while the tire rolls, thereby effectively preventing the spike member from bending at high speed running.

Fourth, the present invention is directed to an anti-slipping device for dual tires, in which a plurality of spike members are coupled to a synthetic resin belt at regular intervals, thereby preventing noise and lessening impact while running; effectively preventing the spike member from tangling; and decreasing weight to enhance convenience of mounting and portability.

Fifth, the present invention is directed to an anti-slipping device for dual tires, in which opposite ends of a belt having a plurality of spike members fixed thereto are detachably coupled with a length-adjustable fastener, so that it is convenient for a user to mount/remove the device on/from the tire and to more tightly fasten the device.

According to an aspect of the present invention, an anti-slipping device for dual tires includes: a plurality of spike members 100 which includes an insertion plate 110 bent in a trapezoidal shape to be inserted between the dual tires, and close-contact plates 120 integrally extending from opposite sides of the insertion plate 110 to closely contact each surface of the dual tires; a belt 200 for connecting the insertion plates 110 of the plurality of spike members 100 to each other; and a fastener 300 detachably coupled to opposite ends of the belt 200 to adjust tension of the belt, wherein the fastener 300 includes first and second connection rings 330a and 330b each inserted into insertion space parts 210a and 210b formed at both ends of the belt 200, and a belt fastener 340 detachably coupled to the first and second connection rings 330a and 330b to adjust tension of the belt 200.

The outer surface of the close-contact plate 120 of the spike member 100 may be provided with at least one first recessed part 112 having a straight shape to prevent the spike member 100 from bending.

A plurality of first and second spikes 121 and 122 may protrude from an outer surface of each close-contact plate 120 of the plurality of spike members 100 at regular intervals to be different in height from each other to prevent friction with a road surface and slipping.

The plurality of first spikes 121 may be lengthwise arranged on a middle of the close-contact plate 120 at regular intervals, and include a hole 121a penetrating the close-contact plate 120 and a cylindrical projection 121b integrally protruding from an outer circumference of the hole 121a.

A top surface of the projection 121b may be formed with an uneven part 121c having a regular or irregular saw-tooth for increasing friction with the road surface.

The plurality of second spikes 122 may be arranged in a zigzag pattern or a W-shape between the plurality of first spikes 121.

A protrusion 123 may protrude from an outer periphery of the close-contact plate 120.

The outer surface of the close-contact plate 120 of the spike member 100 may be provided with at least one second recessed part 124 having a straight shape to prevent the spike member 100 from bending.

A pair of third recessed parts 125 each having a V-shape may protrude from opposite positions where the insertion plate 110 and the close-contact plates 120 of the spike member 100 are connected, to prevent the spike member 100 from bending.

A fourth recessed part 126 having an embossed shape may project from an outer surface of the close-contact plate 120 adjacent to a connection part of the insertion plate 110 and the close-contact plate 120 of each spike member 100 to prevent damage to the spike member 100.

An auxiliary plate 130 may be further fixed to an inner surface of each spike member 100, the auxiliary plate including an insertion plate 110' having the same shape as the spike member 100, and close-contact plates 120' integrally extending from opposite sides of the insertion plate 110' to closely contact each surface of the dual tires.

The belt fastener 340 may include a length adjustment part 341 having a first fastening ring 341-1 detachably coupled to the first connection ring 330a at its one end, and a plurality of length adjustment holes 341-2 formed in a longitudinal direction thereof at predetermined intervals; and a tensioning member 342 having a second fastening ring 342-2 coupled to the second connection ring 330b at its one end, such that the other end of the length adjustment part 341 is slidably inserted into the second fastening ring to sequentially lock or release the length adjustment holes 341-2 using a predetermined resilient force to maintain tension of the belt 200.

The length adjustment part 341 may have a predetermined radius of curvature.

The length adjustment part 341 may include a plurality of separated length adjustment members and a connection wire connected to the length adjustment members, wherein each length adjustment member has a plurality of length adjustment holes 341-2 formed in a longitudinal direction thereof at predetermined intervals, and the connection wire is inserted into outer peripheries of the length adjustment members such that ends of the length adjustment members are in contact with each other.

Preferably, a first length adjustment member installed at one end of the length adjustment part has a pair of first protrusions protruding from both long side surfaces thereof, first connection holes are formed in the pair of first protrusions in a longitudinal direction thereof to insert or extract the connection wire into or from the connection holes, a first fastening ring 341-1 is formed at one end of thereof to be coupled to the first connection ring 330a, a second length adjustment member installed at the other end of the length adjustment part has a second protrusion protruding from an outer periphery of thereof, and a second connection hole is formed in the second protrusion in a longitudinal direction thereof to insert or extract the connection wire into or from the second connection hole.

At least one third length adjustment member may be further installed between the first and second length adjustment members, wherein a pair of third protrusions project from both long side surfaces of the third length adjustment member, and third connection holes are formed in the pair of third protrusions in a longitudinal direction thereof to insert or extract the connection wire into or from the third connection holes.

The tensioning member 342 may include a mounting plate 342-1 in which the length adjustment part 341 is inserted and mounted; a second locking ring 342-2 fixedly formed at one end of the mounting plate 342-1 to be detachably coupled to the second ring 330b; a pair of first and second support plates 342-3 and 342-30 vertically bent from both sides of the mounting plate 342-1 and parallelly aligned with each other; an insertion guide shaft 342-4 disposed under one ends of the first and second support plates 342-3 and 342-3' at its both ends and fixed at a predetermined height such that the other end of the length adjustment part 341 is slidably inserted; a first hinge shaft 342-5 fixedly coupled to one upper sides of the first and second support plates 342-3 and 342-3' at its both ends; a locking pivot pin 342-6 pivotally coupled to a center part of the first hinge shaft 342-5, and having a locking fixing piece 342-6a and a locking release piece 342-6b formed at its both ends to lock and release the length adjustment holes 341-2 when the length adjustment part 341 is inserted; a second hinge shaft 342-7 fixedly coupled to the other upper sides of the first and second support plates 342-3 and 342-3' at its both ends; and a spring 342-8 having a predetermined resilient force, pivotally coupled to one side of the second hinge shaft 342-7, one end of which is fixedly coupled to an outer side of the other end of the first support plate 342-3, and the other end of which resiliently supports an upper surface of the locking fixing piece 342-6a to resiliently maintain a state in which the locking fixing pin 342-6a is locked by the length adjustment hole 341-2.

The tensioning member may further include a cover 342-9 fixedly coupled to upper surfaces of the pair of first and second support plates 342-3 and 342-3', and a locking bolt 342-10 threadedly fastened to a threaded hole 342-9a formed at a center of the cover 342-9 to be in contact with an upper surface of the locking fixing piece 342-6a at its tip to prevent pivotal movement of the locking pivot pin 342-6 due to an external force.

The tensioning member may further include a locking piece 342-11 formed at the tip of the locking bolt 342-10 to prevent separation of the locking bolt 342-10 from the threaded hole 342-9a.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EXEMPLARY EMBODIMENTS

Figure 1:
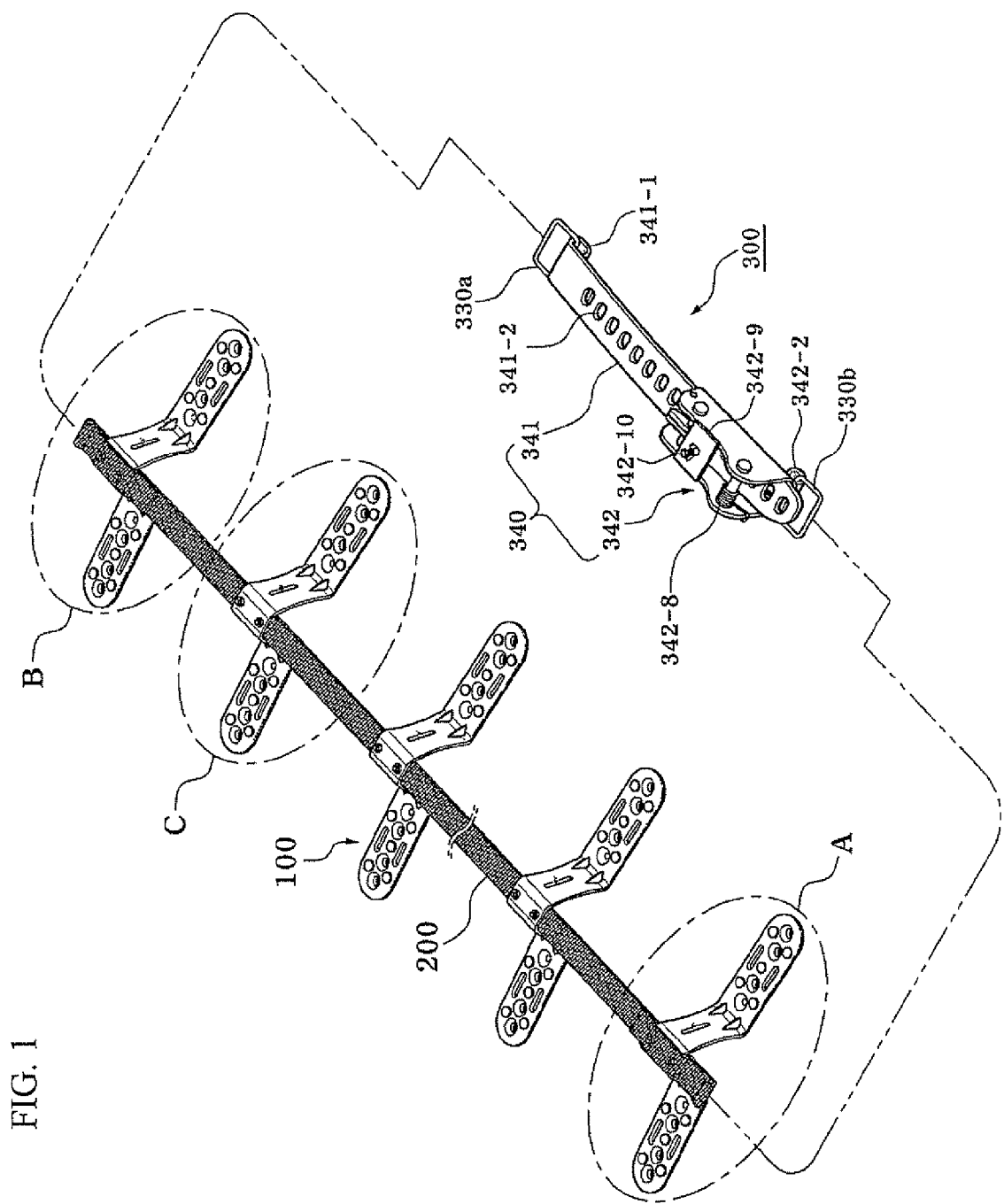
FIG. 1 is a perspective view of an anti-slipping device for dual tires, which is rolled out in a lengthwise direction by separating a spike member and a fastener.

Hereinafter, embodiments of the present invention will be described in detail with reference to the accompanying drawings.

Referring to FIGS. 1 to 20, an anti-slipping device for dual tires according to an embodiment of the present invention includes a plurality of spike members 100, a belt 200 connecting the spike members 100, and a fastener 300 coupled to opposite ends of the belt 200 and adjusting tension of the belt 200.

Here, the plurality of spike members 100 are shaped like a metal plate, and include an insertion plate 110 bent in a trapezoidal (⌒) shape in the middle thereof to be inserted between the dual tires (not shown in the drawings, which are used as a rear wheel of a large truck or the like), and close-contact plates 120 integrally and flatly extending from opposite sides of the insertion plate 110 and closely contacting each surface of the dual tires.

At this time, a top surface of the insertion plate 110 of the spike member 100 is formed with at least one through hole 111 to be coupled with the belt 200 by a coupling unit such as a bolt, a nut, etc.

In addition, at least one first recessed part 112 may further project from the insertion plate 110 in a straight shape to prevent the spike member 100 from bending during high speed running.

Meanwhile, a lateral gap between both surfaces of the insertion plate 110 gradually narrows toward its center part to form a trapezoidal shape to thereby effectively prevent damage to the insertion plate 110 during high speed running.

Further, a plurality of double spikes, i.e., first and second spikes 121 and 122 protrude from an outer surface (in contact with a road surface) of the close-contact plate 120 of the spike member 100 at regular intervals so as to be different in height, thereby enhancing friction with the road surface and preventing slipping.

In more detail, the plurality of first spikes 121 are arranged at regular intervals on the middle of the close-contact plate 120 in a lengthwise direction. The first spike 121 includes a hole 121a penetrating the close-contact plate 120, a projection 121b integrally protruding from a circumference of the hole 121a and having a cylindrical shape, and an uneven part 121c formed on a top surface (in contact with the road surface) of the projection 121b and shaped like a regular or irregular saw-tooth to increase friction with the road surface.

The plurality of second spikes 122 are fixedly coupled to the opposite sides of the close-contact plate 120 by a rivet between the first spikes 121. For example, the second spike 122 is formed of metal materials such as tungsten or the like, which has high stiffness and good abrasion resistance.

The plurality of second spikes 122 are stuck into snow or ice on the road, so that the friction between the road and the anti-slipping device increases, thereby effectively preventing the vehicle from slipping and consulting safety running of the vehicle.

Further, the plurality of second spike 122 are shaped like a cone, so that a contact rate between the road and the anti-slipping device is minimized, thereby rarely damaging the road surface to satisfy regulations of various countries (e.g., United States and so on).

Also, the second spike 122 protrudes higher than the first spike 121 by a predetermined height (preferably, about 1 mm~3 mm), so that the first spike 121 for anti-slipping on the snowy road is effectively prevented from abrasion on the way of running.

Additionally, the plurality of second spikes 122 are arranged not in a straight-line but in a zigzag pattern or a W-shape along a width direction of the close-contact plate 120, so that a scratch area becomes larger on the icy road, thereby maximizing the braking power.

Additionally, a protrusion 123 may further protrude from an outer periphery of the close-contact plate 120 (a portion in contact with a road surface), and regular or irregular teeth shaped uneven parts (see 121c of FIG. 6) may be further formed at an upper surface over the protrusion 123, that is, a portion in contact with a road surface, to increase a friction force to the road surface.

The protrusion 123 may be bent from an outer periphery of the close-contact plate 120, i.e., a contact surface with the road surface, at a predetermined angle (preferably, about 0° to 90°).

In addition, at least one second recessed part 124 protruding from an outer surface of the close-contact plate 120, i.e., a contact surface with the road surface, to form a longitudinally straight shape to minimize a contact surface of the close-contact plate 120 of the spike member 100 to the road surface during rotation of the tire, thereby effectively preventing the spike member 100 from bending during high speed running.

Also, for example, a pair of third recessed parts 125 each having a V-shape additionally protrude from opposite positions where the insertion plate 110 and the close-contact plates 120 of the spike member 100 are connected, thereby further effectively preventing the spike member 100 from bending at the high speed running.

Further, a fourth recessed part 126 having an embossed shape may further protrude from an outer surface of the close-contact plate 120 adjacent to a connection part of the insertion plate 110 and the close-contact plate 120, i.e., a contact surface with the road surface, to effectively prevent damage to the spike member 100 during high speed running.

Figure 7:
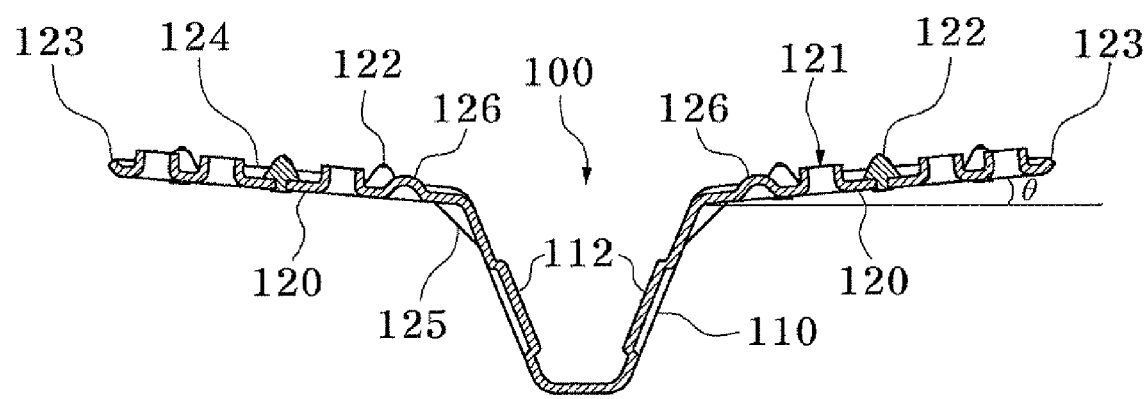
FIG. 7 is a cross-sectional view of a second example of a spike member according to an embodiment of the present invention.

Meanwhile, the close-contact plate 120 may be bent from both sides of the insertion plate 110 at a predetermined angle θ corresponding to a lateral radius of curvature of each tire of dual tires to be more closely contacted with a surface of each tire (see FIG. 7). At this time, the predetermined angle θ may be about 3° to 7° (preferably, about 5°).

Figure 8:
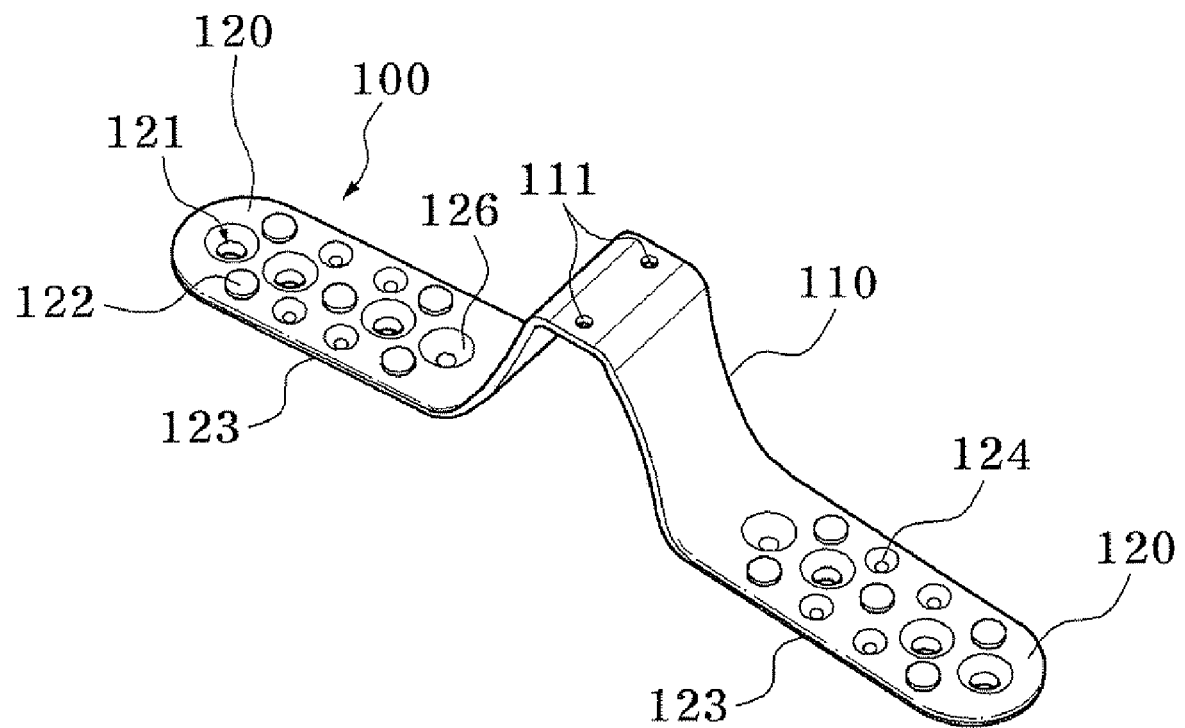
FIG. 8 is perspective view of a third example of a spike member according to an embodiment of the present invention.

As shown in FIG. 8, the first recessed part 112 and the third recessed parts 125 of the spike member 100 are removed, the second recessed parts 124 is changed into embossing pattern, the connection part of the insertion plate 110 and the close-contact plate 120 is curved.

Figure 9A:
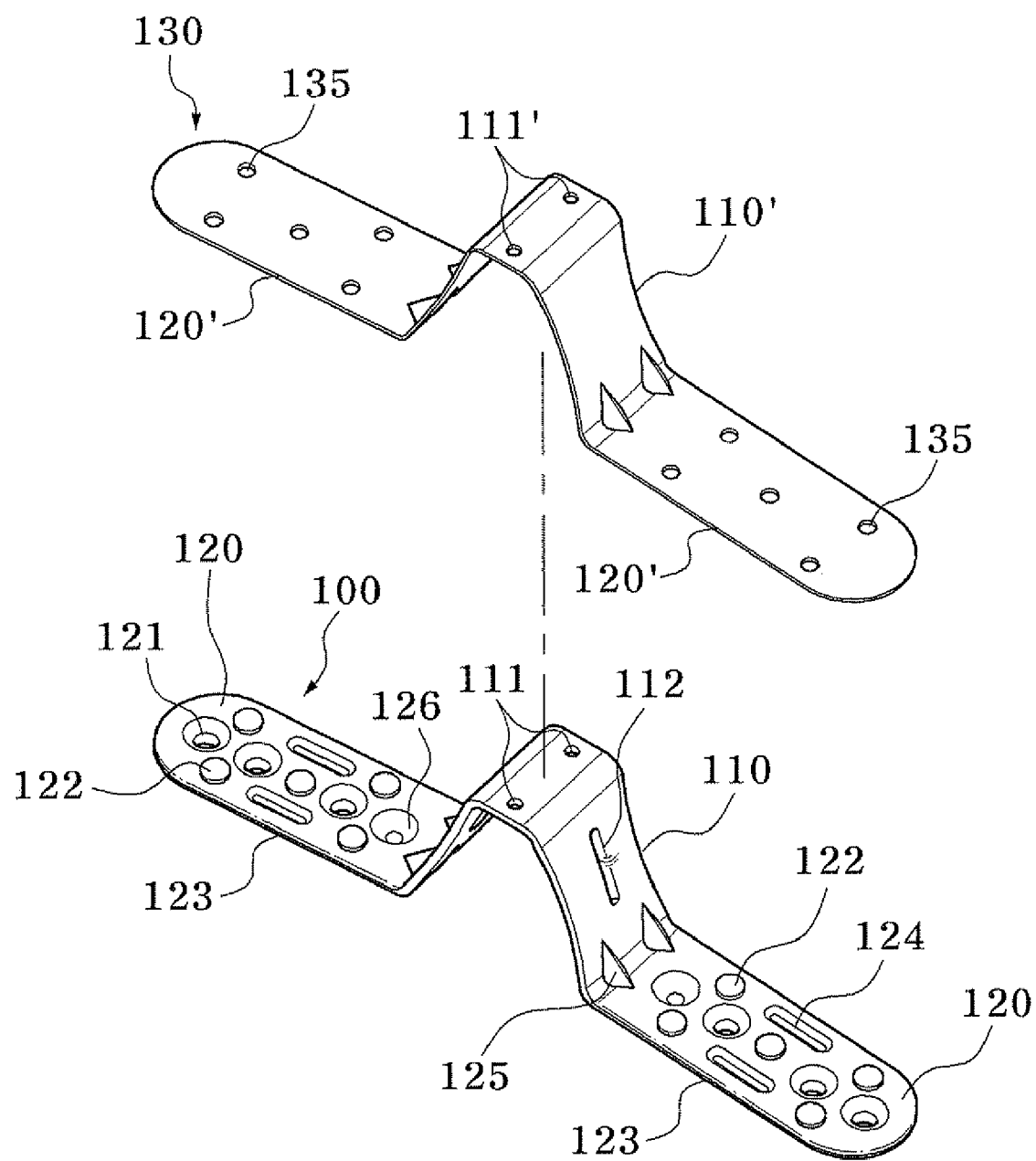
FIGS. 9A and 9B are exploded and coupled perspective views of a fourth example of a spike member according to an embodiment of the present invention.
Figure 9B:
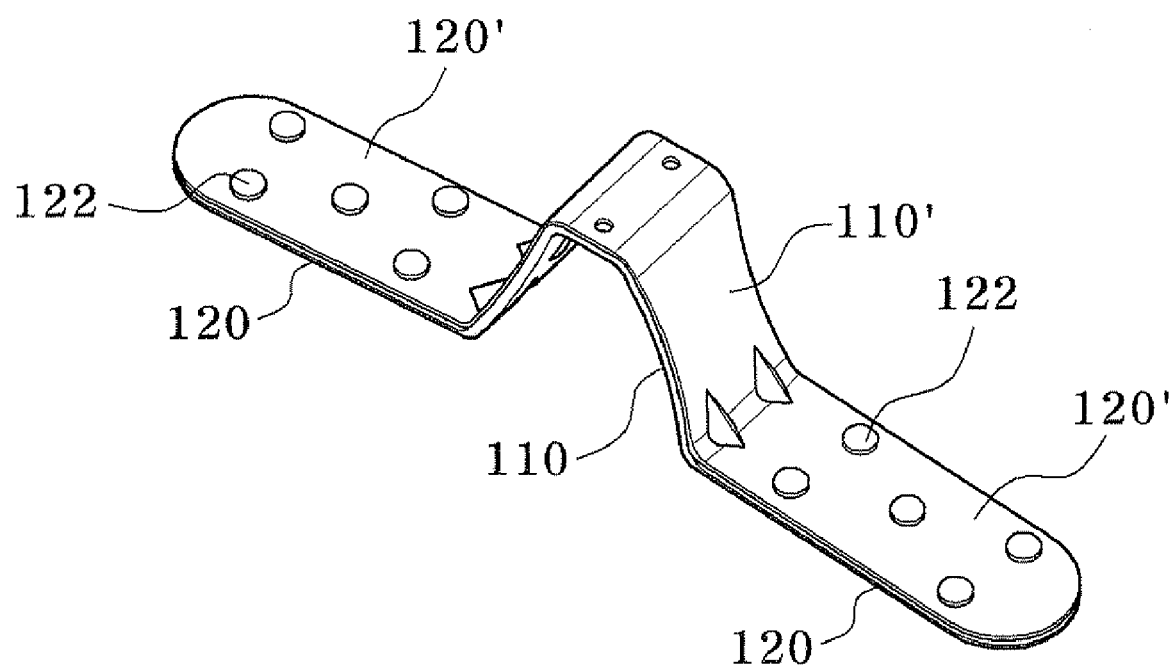

Moreover, as shown in FIGS. 9A and 9B, an auxiliary plate 130 may be further installed at an inner surface of the spike member 100 (a portion in close contact with the surface of the tire) to effectively prevent separation of the spike member 100 upon breakage of the spike member 100 during high speed running, prevent the spike member 100 from bending, and effectively reinforce strength of the spike member 100.

The auxiliary plate 130 is formed of a thin steel plate having the same shape as the spike member 100. Similar to the spike member 100, the auxiliary plate 130 includes an insertion plate 110' and close-contact plates 120' extending from both sides thereof in parallel. At least one through hole 111' is formed in the upper surface of the insertion plate 110' at the same position and size as the at least one through hole 111 of the insertion plate 110 of the spike member 100 in order to fix the auxiliary plate 130 to the spike member 100 and the belt 200 using a fixing means such as a bolt and a nut BN.

In addition, a plurality of coupling holes 135 are formed in the close-contact plates 120' of the auxiliary plate 130 at the same positions as the second spikes 122 such that the second spikes 122 are inserted into the coupling holes 135 to securely fix the close-contact plates 120 of the spike member 100 to the auxiliary plate 130 through the same method as the second spikes 122 fixed to the close-contact plates 120 of the spike member 100, i.e., a conventional riveting method.

Figure 10:
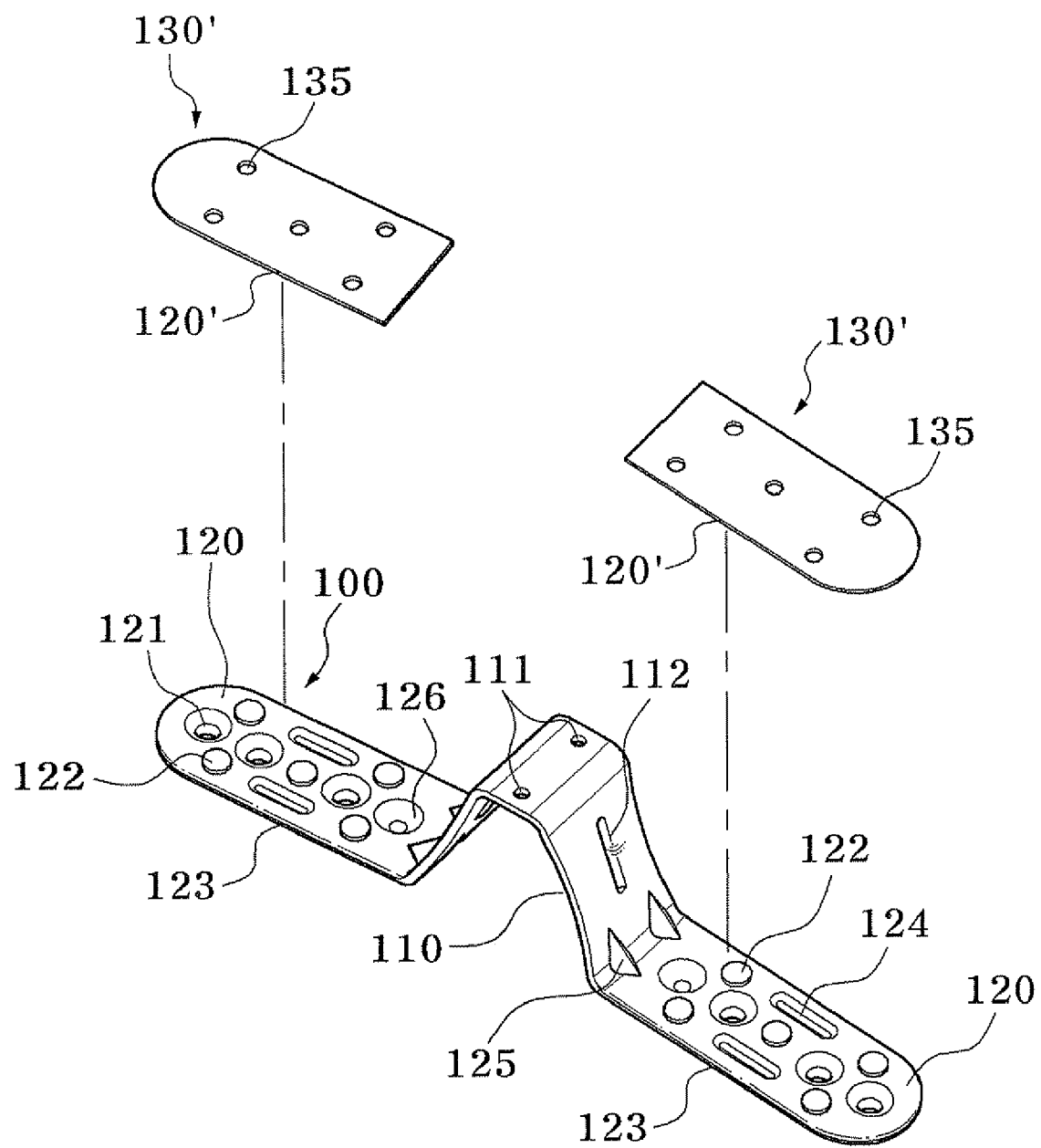
FIG. 10 is exploded perspective view of a fifth example of a spike member according to an embodiment of the present invention.

Meanwhile, As shown in FIG. 10, the auxiliary plate 130 is formed with only the close-contact plates 120' without the insertion plate 110'.

With this configuration, the plurality of spike members 100 can be conveniently replaced piece by piece, so that it is semipermanently usable.

In the meantime, the belt 200 is made of a synthetic resin material. To increase tension, the belt 200 can be formed by stacking at least one synthetic resin material. It is preferable but not necessary, like a general flat belt, that the belt 200 includes a polyimid interior and a Nitrile-Butadiene Rubber (NBR) surface resistant to friction and abrasion.

Figure 2:
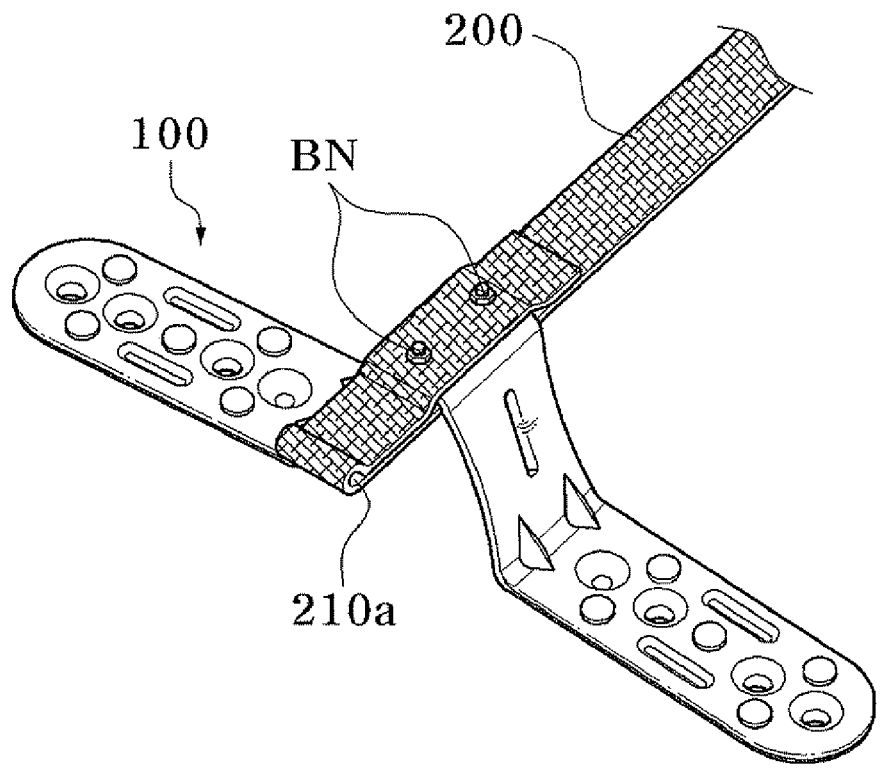
FIGS. 2 through 4 are enlarged perspective views of "A", "B" and "C" in FIG. 1, respectively.
Figure 3:
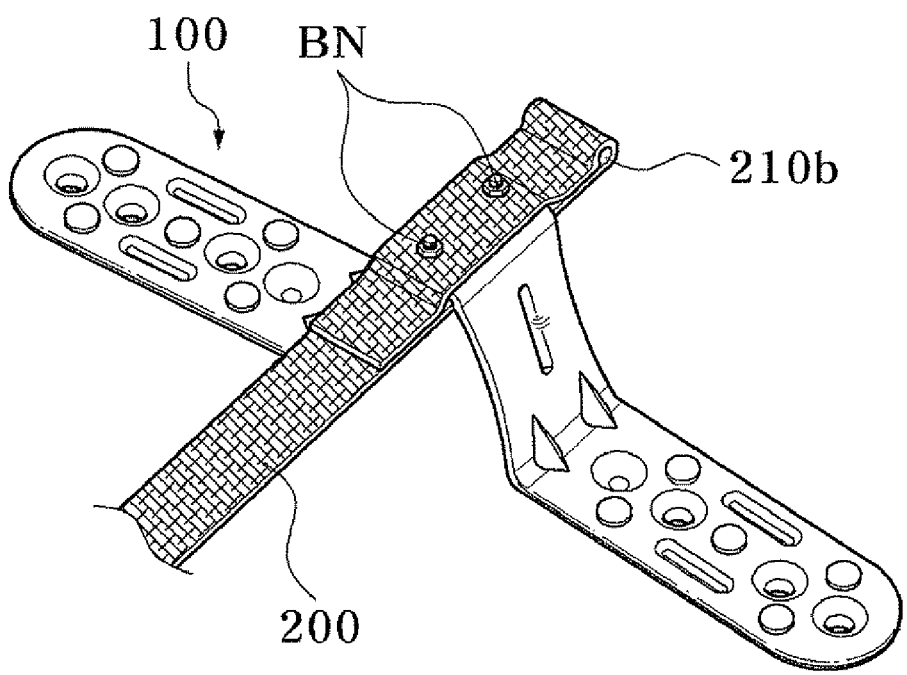
Figure 4:
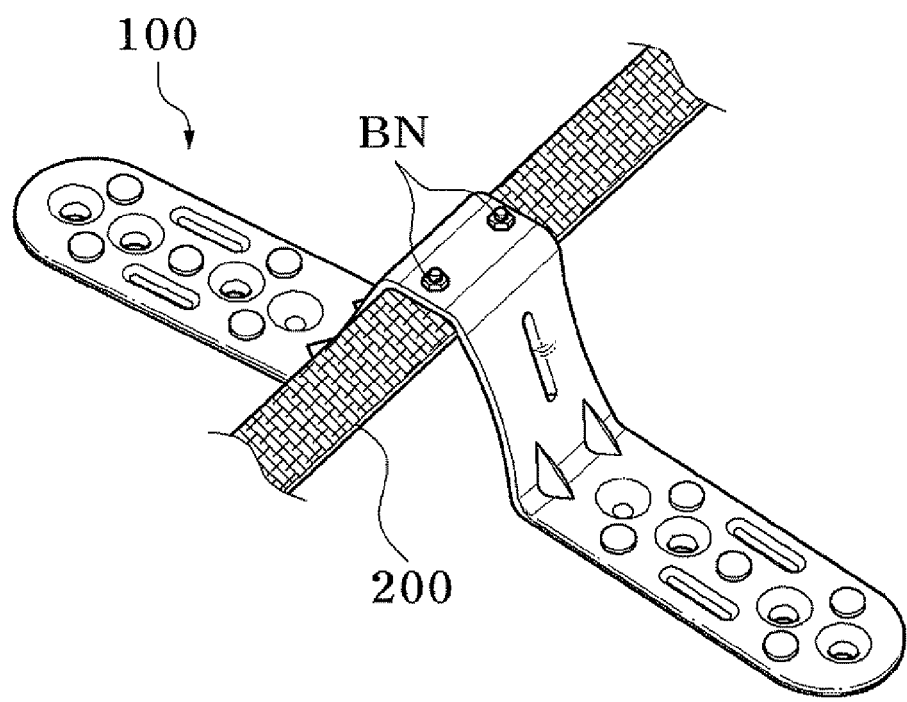
Figure 5:
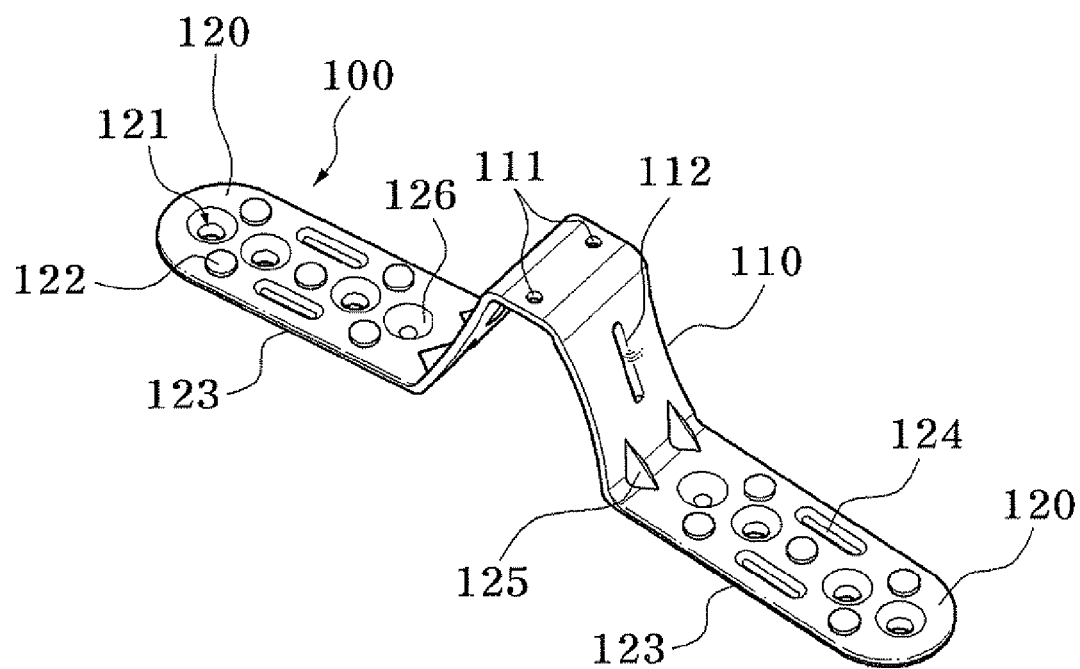
FIGS. 5 and 6 are perspective views and a cross-sectional view of a first example of a spike member according to an embodiment of the present invention.
Figure 6:
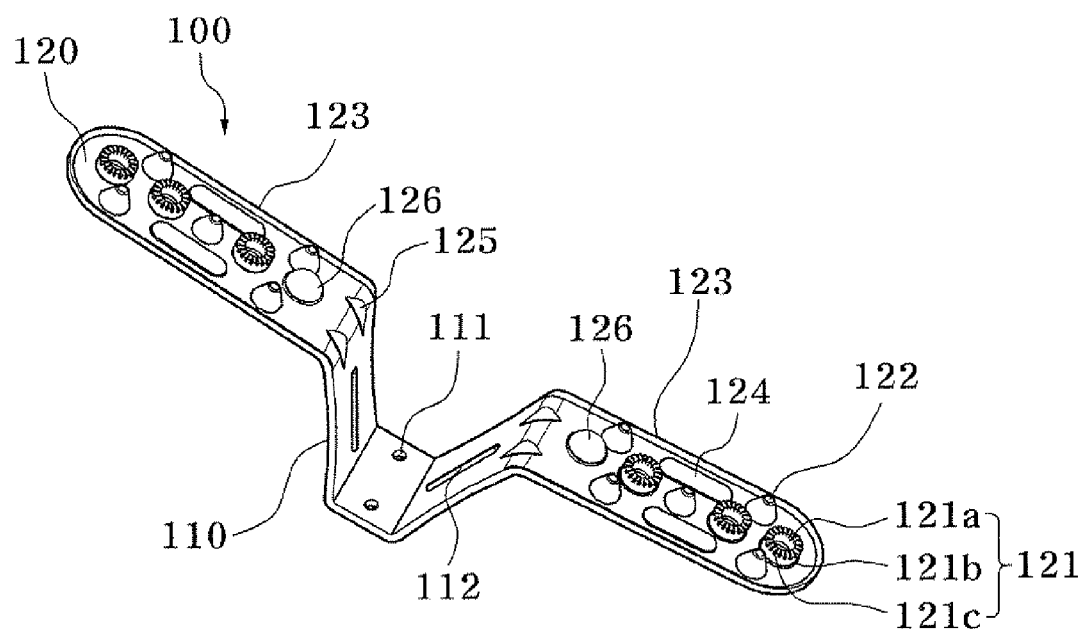

As shown in FIGS. 2 and 3, the opposite ends of the belt 200 are formed with insertion spaces 210a and 210b in which first and second locking rings of the fastener 300 to be described are later coupled.

The insertion spaces 210a and 210b may be formed by folding the end of the belt 200 by a predetermined length onto the belt 200 to cross over at least one spike member 100, and then fixedly fastening it with a bolt, a nut N, or the like.

The plurality of spike members 100 are coupled to the belt 200 having this configuration at regular intervals, thereby preventing noise and lessening impact while running; effectively preventing the spike member from tangling; and decreasing weight to enhance convenience of mounting and portability.

Figure 11:
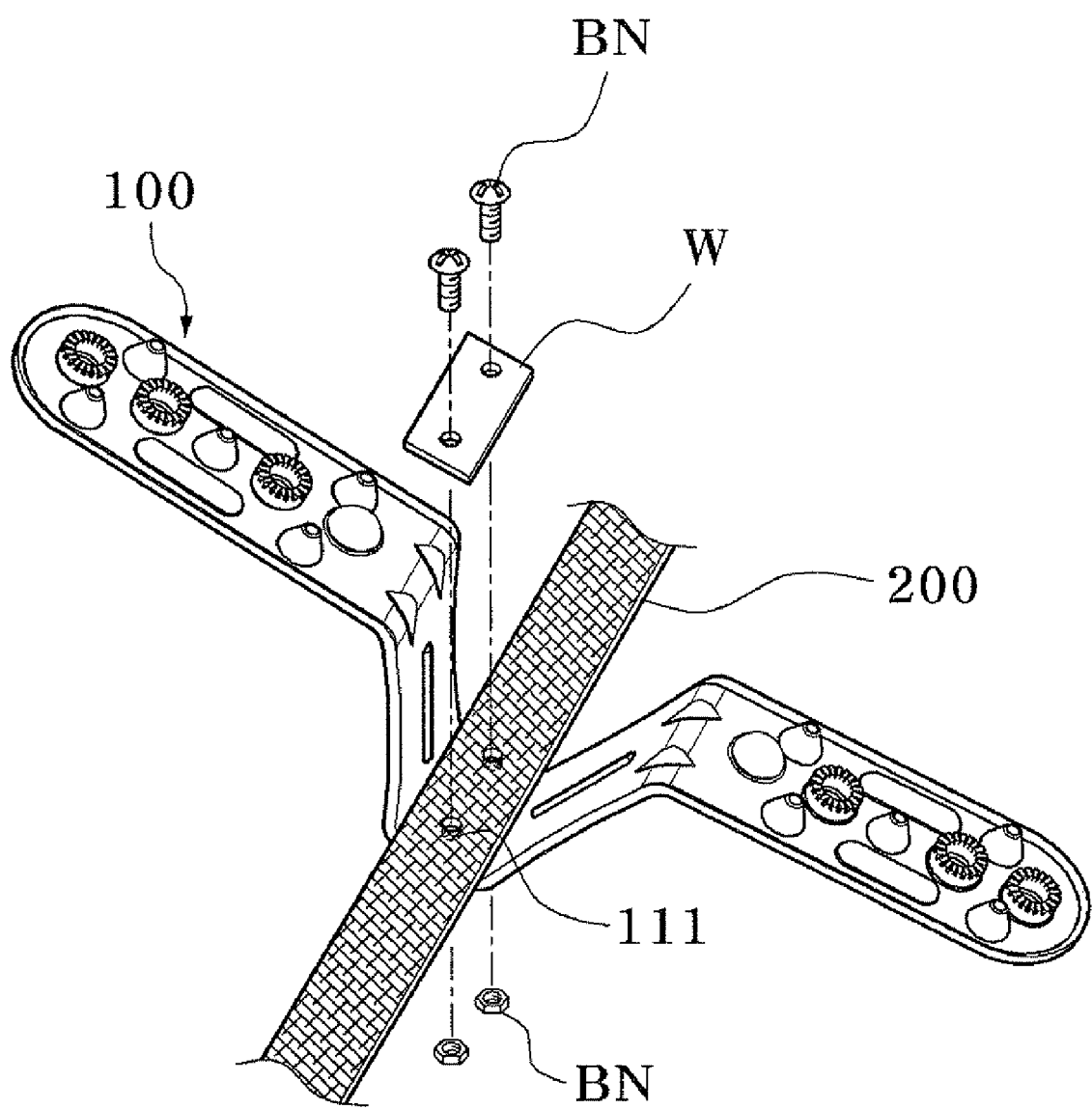
FIG. 11 is an exploded perspective view illustrating the connection between a spike member and a belt according to an embodiment of the present invention.
Figure 12:
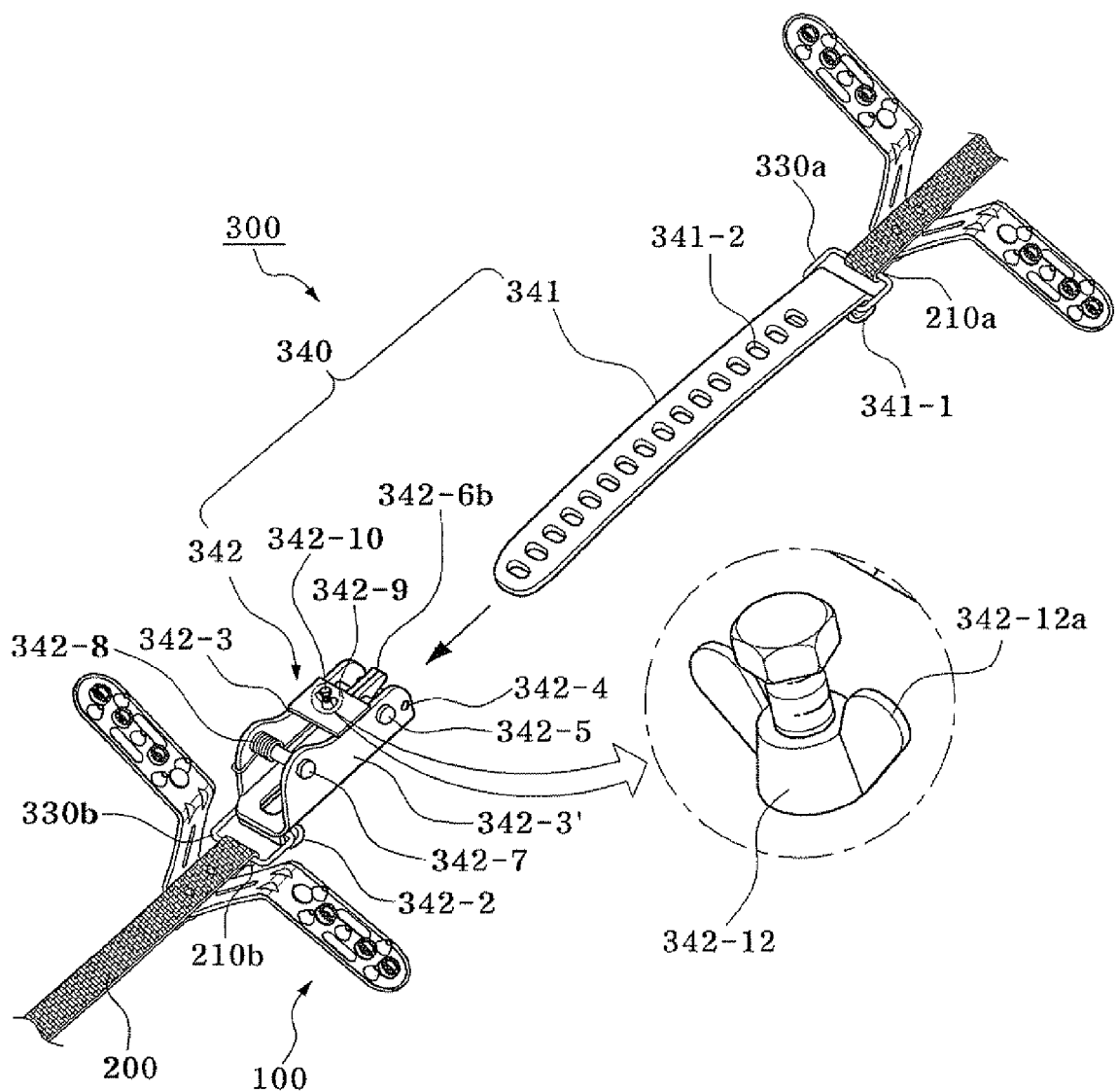
FIGS. 12 and 13 are perspective views illustrating coupling between a fastener and a belt according to an embodiment of the present invention.
Figure 13:
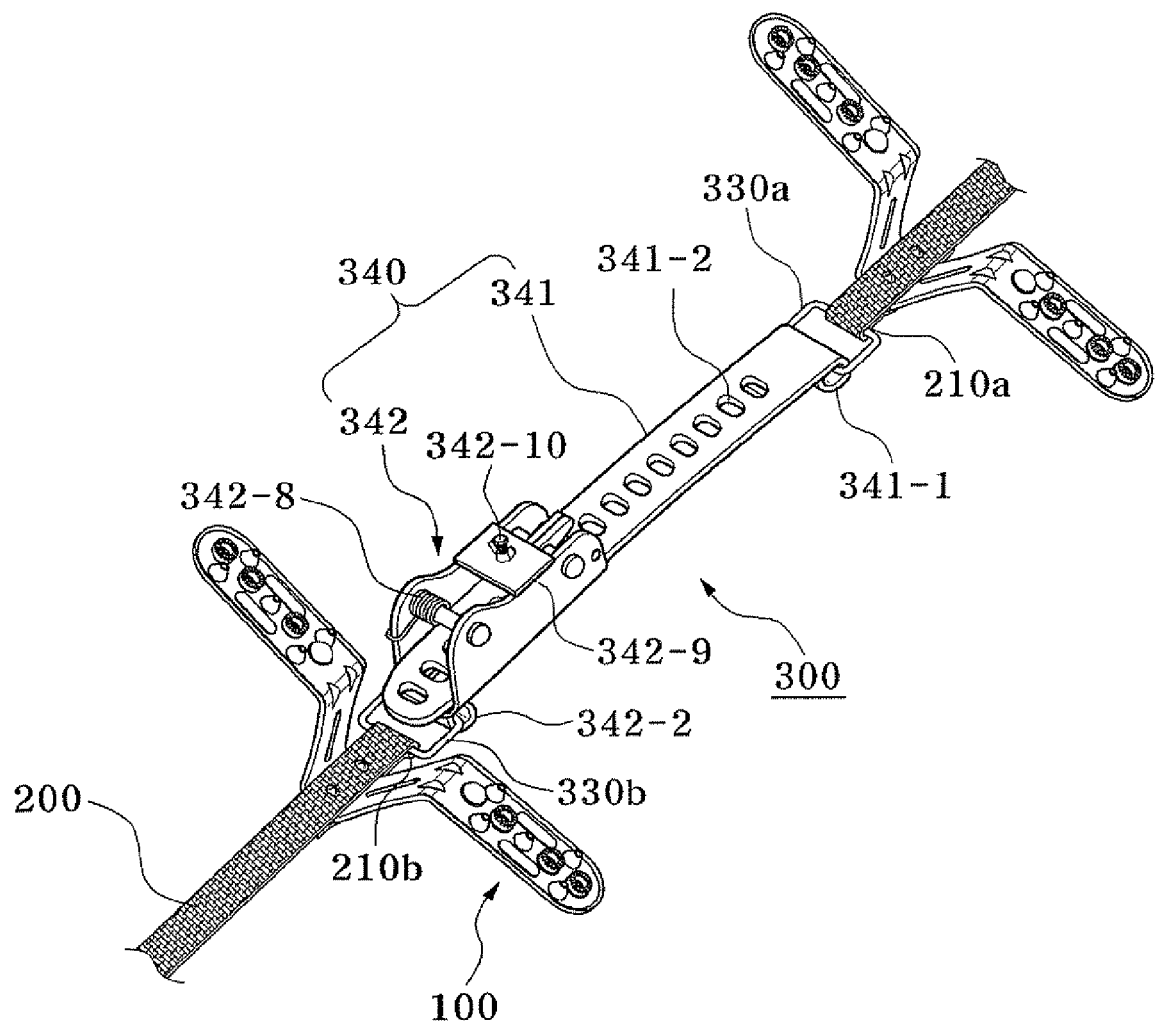
Figure 14:
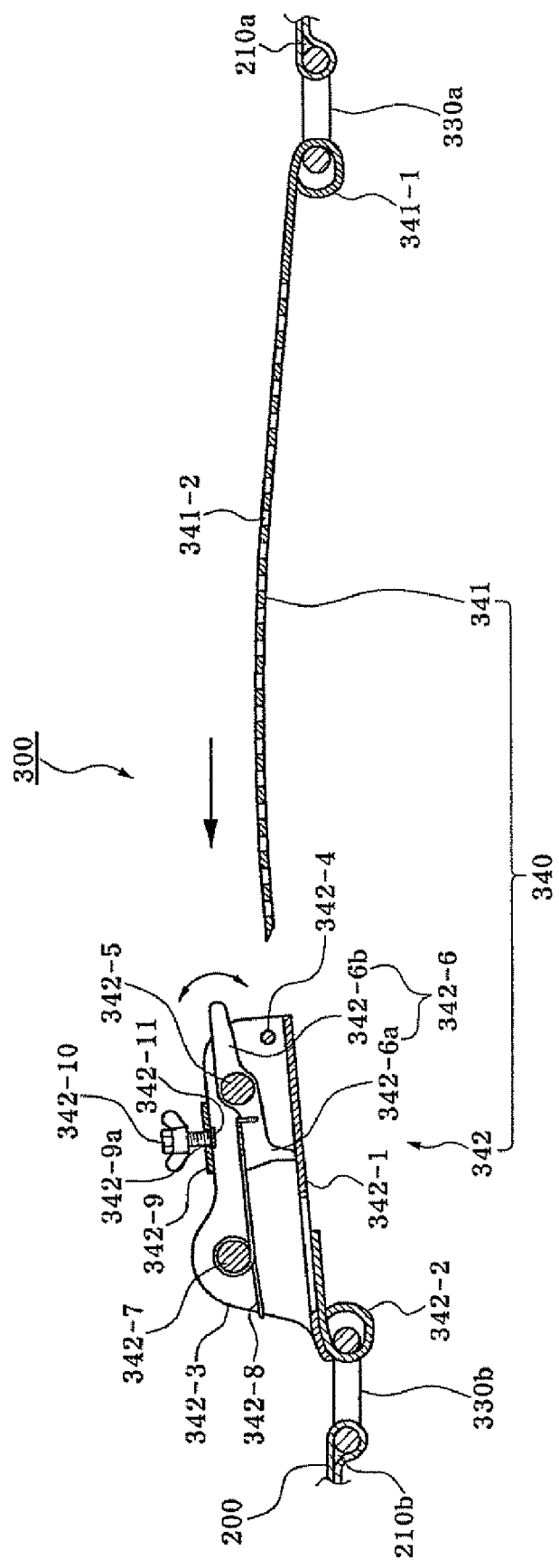
FIGS. 14 through 16 are cross-sectional views illustrating coupling between a fastener and a belt according to an embodiment of the present invention.
Figure 15:
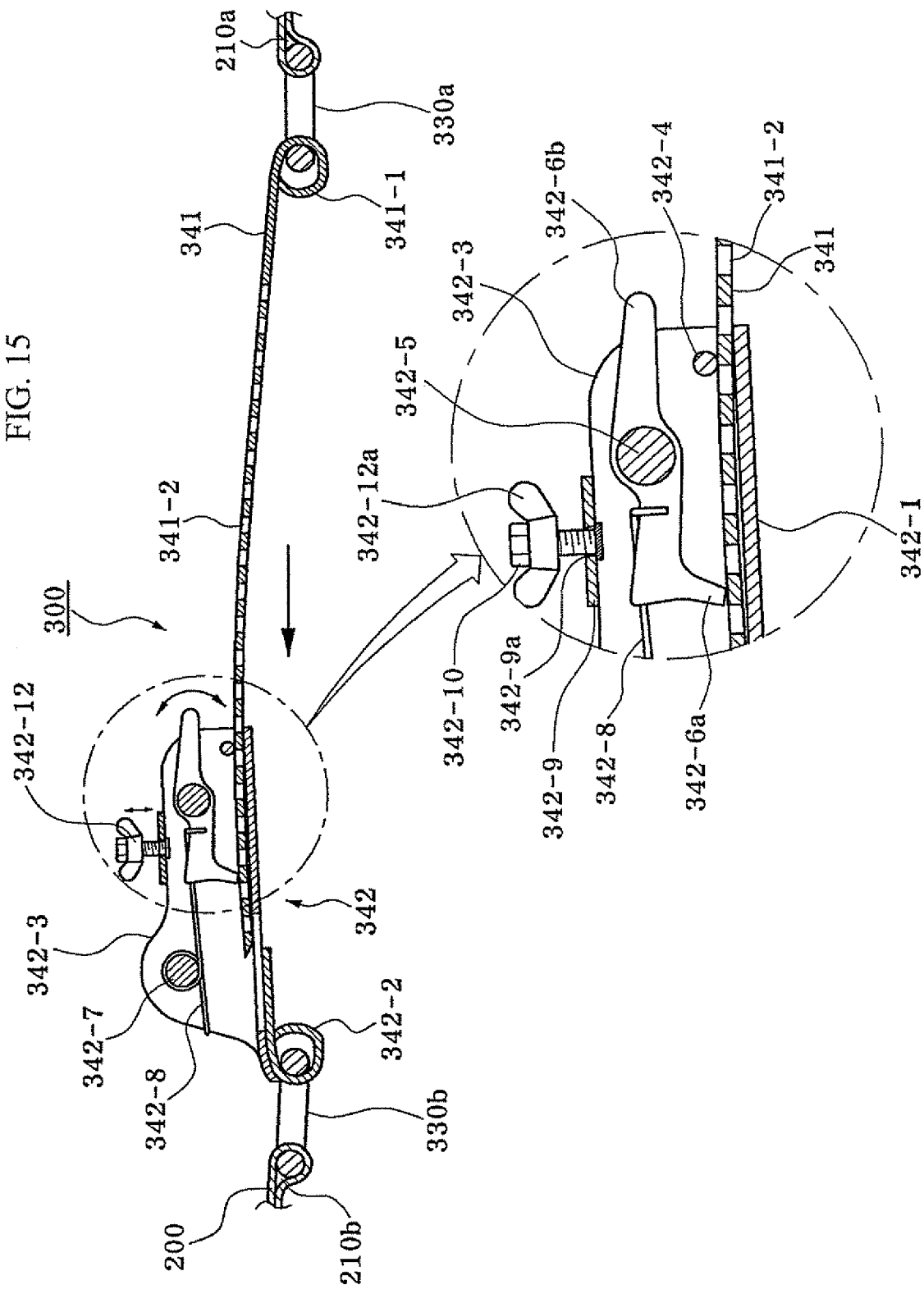
Figure 16:
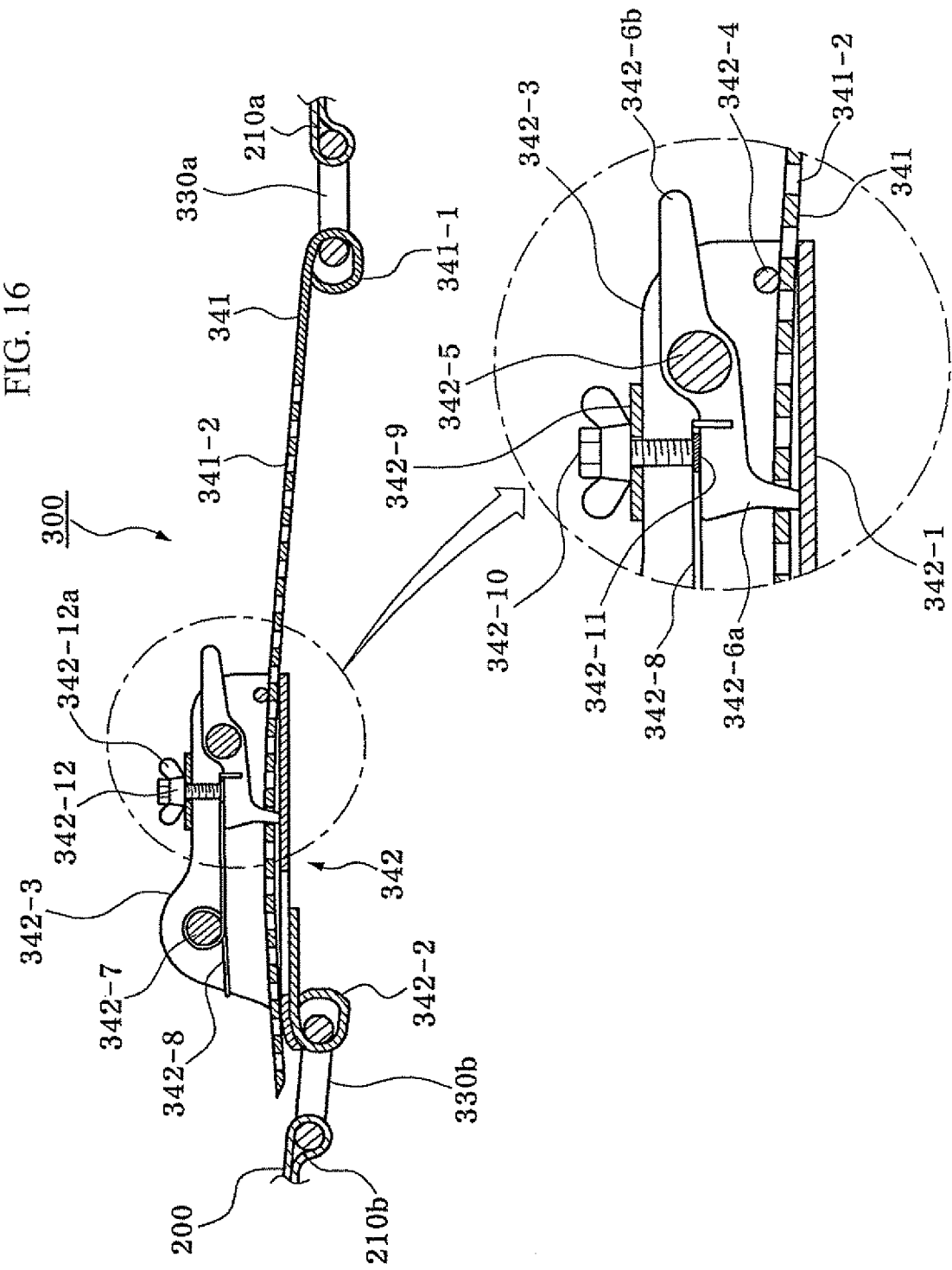

With regard to the coupling between the spike member 100 and the belt 200, as shown in FIG. 11, the belt 200 is coupled to the top surface of the insertion plate 110 of the spike member 100 by inserting at least one bolt, at least one nut N and at least one washer W into the through hole 111 formed on the insertion plate 110 of the spike member 100.

In this embodiment, the spike member 100 and the belt 200 are coupled by the bolt and the nut N, but not limited thereto. Alternatively, the spike member and the belt may be coupled by a typical rivet.

In addition, as shown in FIGS. 1, and 12 to 16, the fastener 300 includes first and second connection rings 330a and 330b inserted into insertion space parts 210a and 210b formed at both ends of the belt 200, and a belt fastener 340 coupled to the first and second connection rings 330a and 330b to adjust tension of the belt 200.

Here, the belt fastener 340 may include a length adjustment part 341 having a first fastening ring 341-1 coupled to the first connection ring 330a at its one end, and a plurality of length adjustment holes 341-2 formed in a longitudinal direction thereof at predetermined intervals; and a tensioning member 342 having a second fastening ring 342-2 coupled to the second connection ring 330b at its one end, such that the other end of the length adjustment part 341 is slidably inserted inside the second fastening ring to sequentially lock or release the length adjustment holes 341-2 using a predetermined resilient force to maintain tension of the belt 200.

Specifically describing, the length adjustment part 341 is formed of a rectangular steel plate, for example, a 30 cm steel scale. A first fastening ring 341-1 is formed at one end of the length adjustment part 341 to be coupled to the first connection ring 330a, and a plurality of length adjustment holes 341-2 are formed in a longitudinal direction of the length adjustment part 341 at predetermined intervals.

The length adjustment part 341 may have a predetermined radius of curvature to correspond to a radius of curvature when the anti-slipping device in accordance with the present invention is coupled to each tire of the dual tires.

Figure 17A:
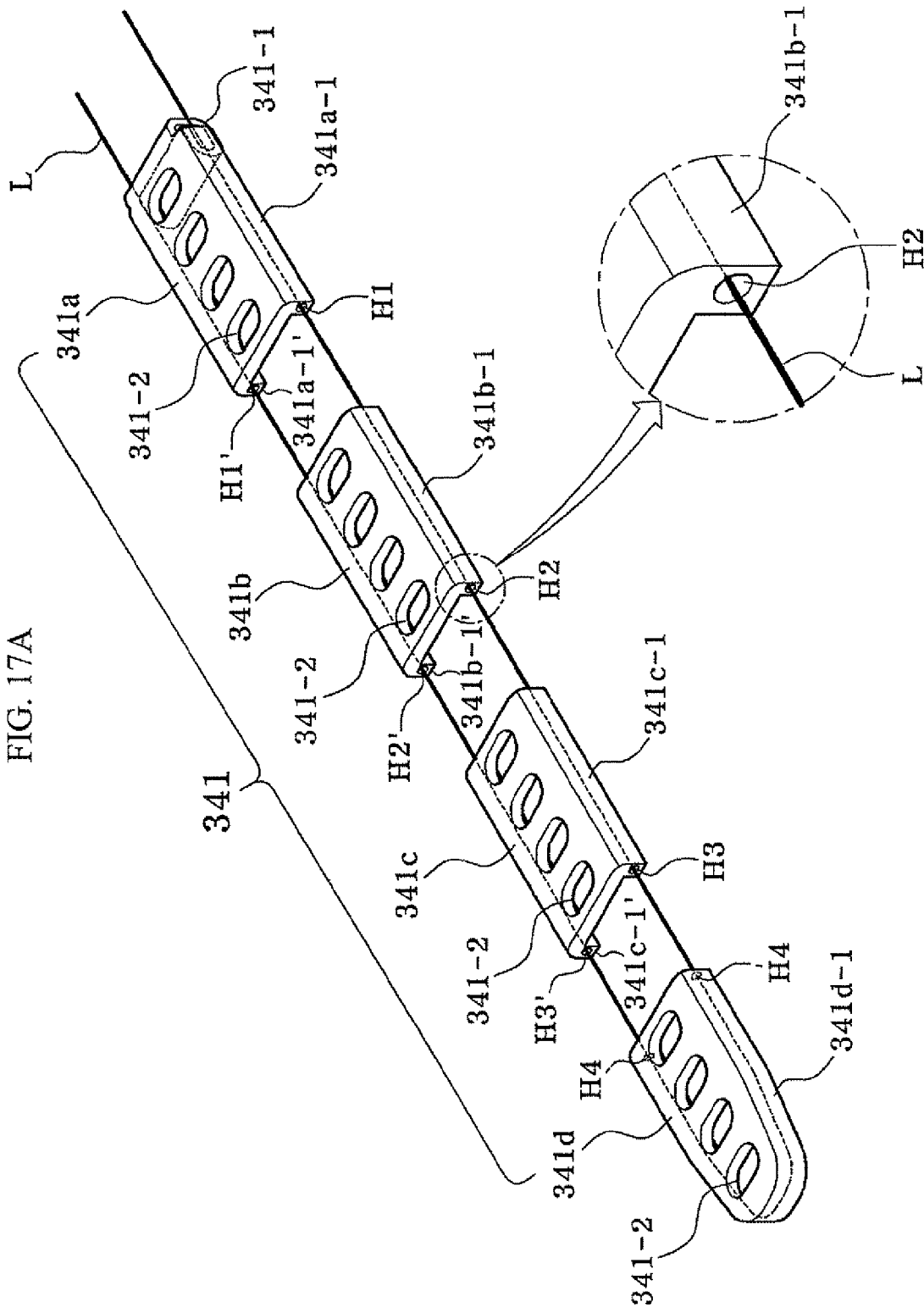
FIGS. 17A and 17B are exploded and coupled perspective views of an example of a length adjustment part according to an embodiment of the present invention.
Figure 17B:
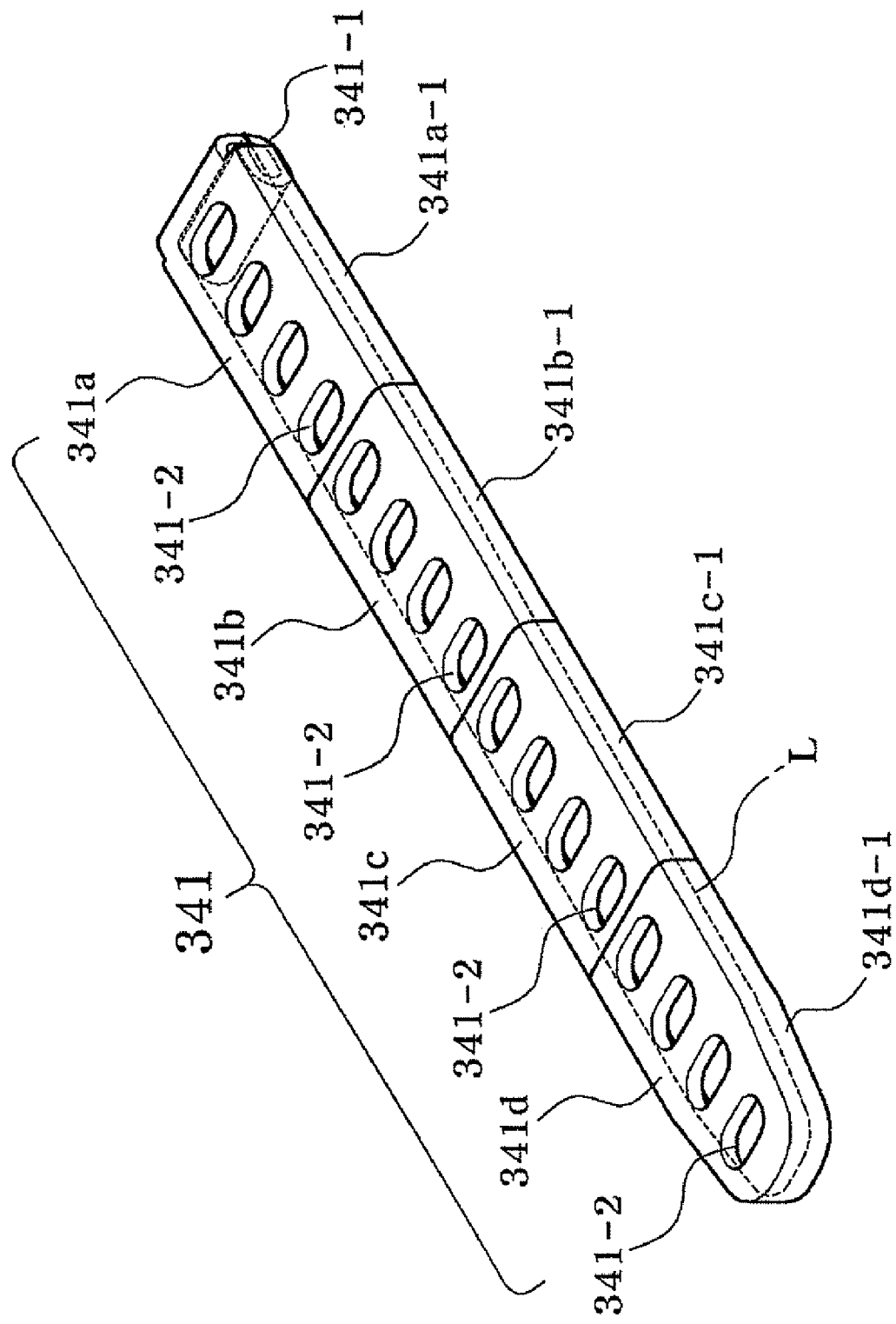

Meanwhile, as shown in FIGS. 17A and 17B, another embodiment of the length adjustment part 341 includes first to fourth length adjustment members 341a to 341d, separated from each other, and a connection wire L fixed thereto, rather than the length adjustment part 341 of the above embodiment, which is integrally formed.

The length adjustment part 341 has the same function and shape as the length adjustment part 341 of the above embodiment when the first to fourth length adjustment members 341a to 341d are connected to each other by the connection wire L.

The first to fourth length adjustment members 341a to 341d each is formed of a rectangular steel plate, and each has a plurality of length adjustment holes 341-2 formed in a longitudinal direction thereof at predetermined intervals.

Here, a pair of first protrusions 341a-1 and 341a-1' protrude from both long side surfaces of the first length adjustment member 341a installed at one end of the length adjustment part 341, and first connection holes H1 and H1' are formed in the pair of first protrusions 341a-1 and 341a-1' in a longitudinal direction thereof to insert or extract the connection wire L into or from the first connection holes H1 and H1'. In addition, a first fastening ring 341-1 is formed at one end of the first length adjustment member 341a to be coupled to the first connection ring 330a.

Further, a fourth protrusion 341d-1 protrudes from an outer periphery of the fourth length adjustment member 341d installed at the other end of the length adjustment part 341, and a fourth connection hole H4 is formed in the fourth protrusion 341*d*-1 to insert or extract the connection wire L into or from the fourth connection hole H4.

Furthermore, a pair of second protrusions 341*b*-1 and 341*b*-1' protrude from both long side surfaces of the second length adjustment member 341*b* installed between the first and fourth length adjustment members 341*a* and 341*d*, and second connection holes H2 and H2' are formed in the pair of second protrusions 341*b*-1 and 341*b*-1' in a longitudinal direction thereof to insert or extract the connection wire L into or from the connection holes H2 and H2'.

In addition, a pair of third protrusions 341*c*-1 and 341*c*-1' protrude from both long side surfaces of the third length adjustment member 341*c* installed between the first and fourth length adjustment members 341*a* and 341*d*, and third connection holes H3 and H3' are formed in the pair of third protrusions 341*c*-1 and 341*c*-1' in a longitudinal direction thereof to insert or extract the connection wire L into or from the connection holes H3 and H3'.

While the connection wire L is formed of a steel wire in which a plurality of steel cores are twisted, but not limited thereto, the connection wire L may be formed of a metal or synthetic resin wire, which is not readily broken.

Coupling of the first to fourth length adjustment member 341*a* to 341*d* is performed by inserting one end of the connection wire L having a certain length through the first connection hole H1, the second connection hole H2, the third connection hole H3, the fourth connection hole H4, the third connection hole H3', the second connection hole H2', and the first connection hole H1', and then, the one end and the other end of the connection wire L are securely fixed to a conventional fixing means such as a clip, a punch, welding, or the like, to closely contact ends of the first to fourth length adjust members 341*a* to 341*d* with each other to form the same shape as the length adjustment part 341 of the one embodiment.

While the length adjustment part 341 of another embodiment is described to include four length adjustment members (see FIGS. 17A and 17B), but not limited thereto, the length adjustment part may include at least two separated members.

Since the length adjustment part 341 of another embodiment includes the first to fourth length adjustment members 341*a* to 341*d*, it is possible to effectively reduce probability of damaging to the length adjustment part 341 of the one embodiment.

Figure 18A:
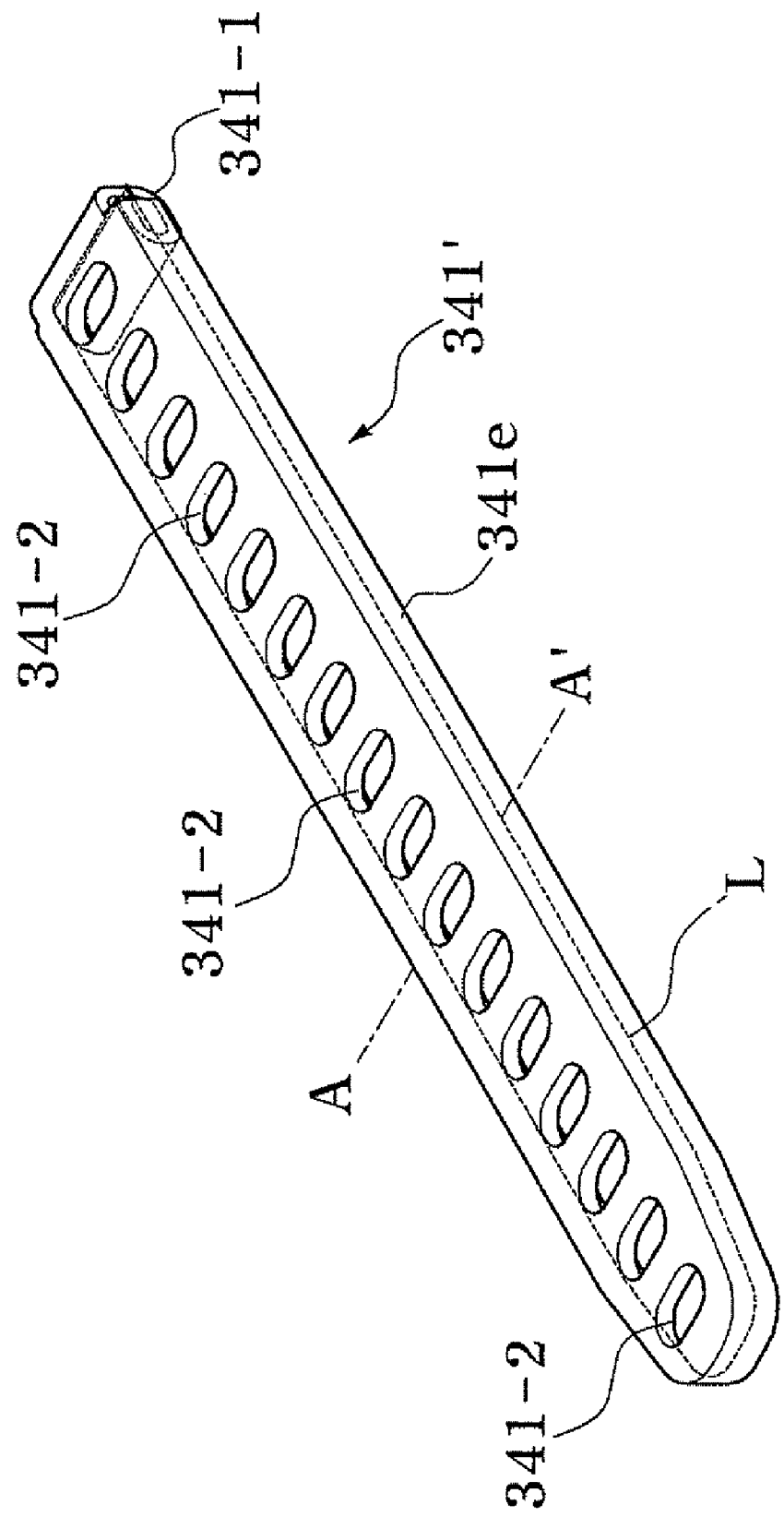
FIGS. 18A and 18B are a perspective view and a cross-sectional view taken along line A-A' showing another exemplary structure of a length adjustment part applied to the embodiment of the present invention.
Figure 18B:
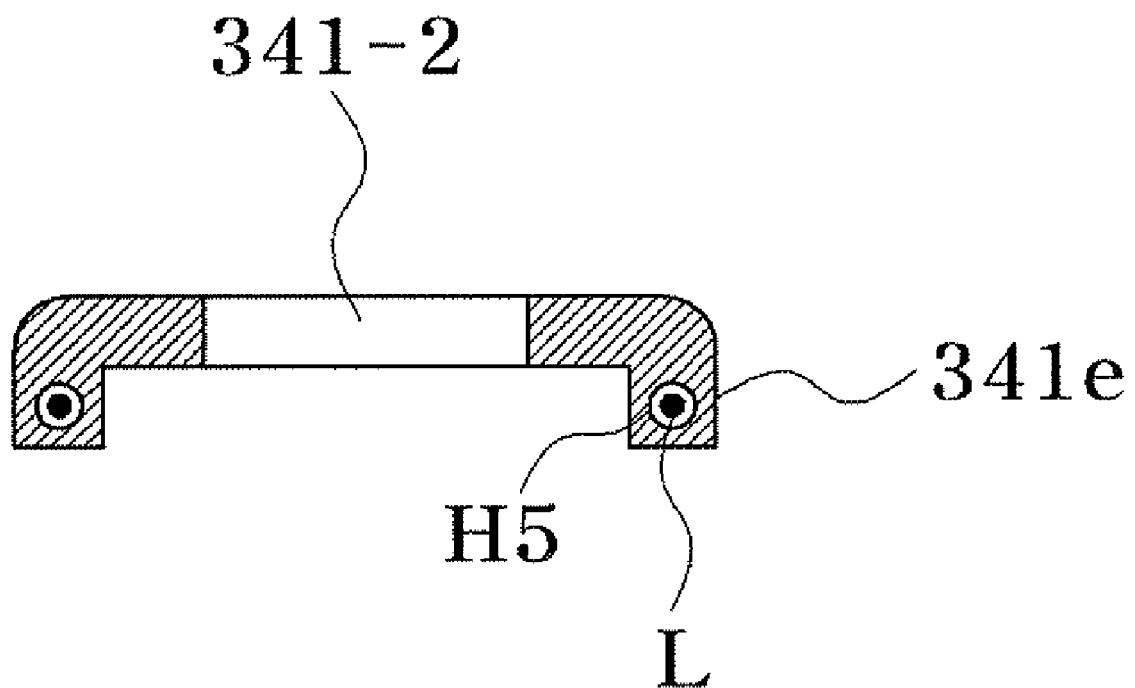

FIGS. 18A and 18B are a perspective view and an A-A' cross-sectional view showing another exemplary structure of a length adjustment part applied to the embodiment of the present invention, showing the length adjustment part 341' in which the first to fourth length adjustment members 341*a* to 341*d*, the first to fourth protrusions 341*a*-1 and 341*a*-1' to 341*c*-1, and the first to fourth connection holes H1 to H4, shown in FIGS. 17A and 17B, are integrally formed with each other.

That is, the length adjustment part 341' is formed of a rectangular steel plate, for example, a 30 cm steel scale. A fifth protrusion 341*e* protrudes from an outer periphery of the length adjustment part 341', and a fifth connection hole H5 is formed in a longitudinal direction of the fifth protrusion 341*e* to insert or extract the connection wire L into or from the connection hole H5. In addition, the connection wire L is fixedly inserted into the fifth connection hole H5.

Figure 19A:
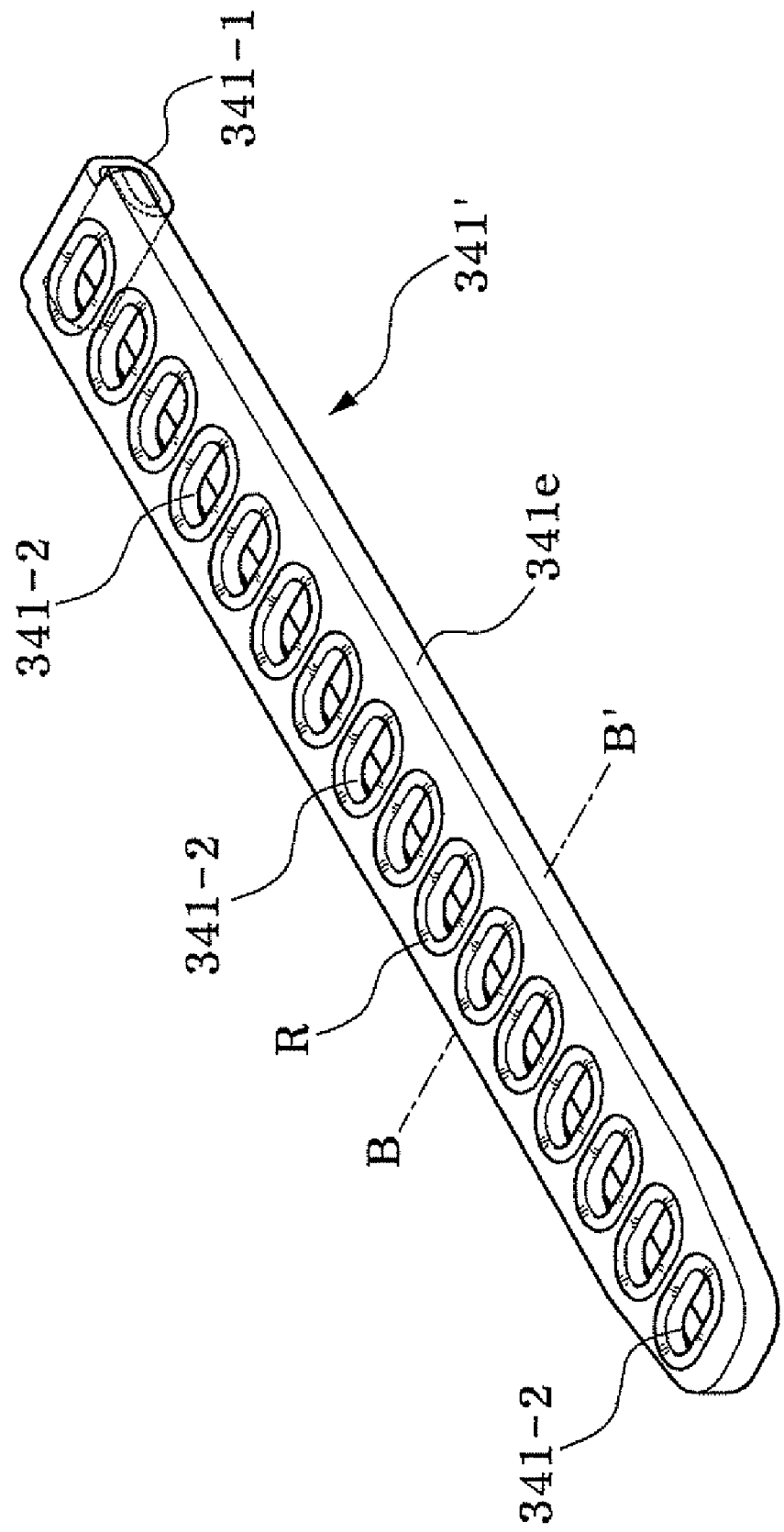
FIGS. 19A and 19B are a perspective view and a cross-sectional view taken along line B-B' showing still another exemplary structure of a length adjustment part applied to the embodiment of the present invention.
Figure 19B:
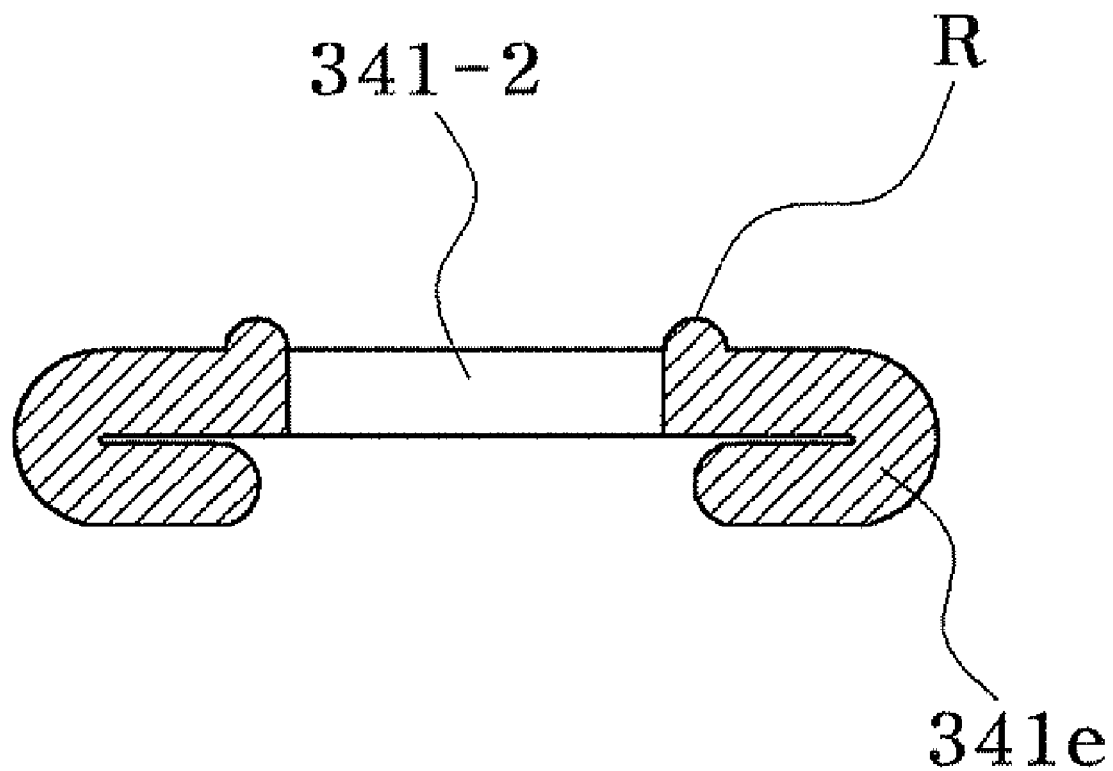

FIGS. 19A and 19B are a perspective view and a B-B' cross-sectional view showing still another exemplary structure of a length adjustment part applied to the embodiment of the present invention. The fifth connection hole H5 and the connection wire L provided in the integrated length adjustment part 341' shown in FIGS. 18A and 18B are removed, and the fifth protrusion 341*e* is inwardly folded at a lower surface of the length adjustment part 341' to opposite each other, thereby improving tensile strength of the length adjustment part 341' to effectively prevent crack and breakage thereof during running.

In addition, a reinforcement rib R projects around the length adjustment holes formed in the length adjustment part 341' to improve strength thereof.

Figure 20A:
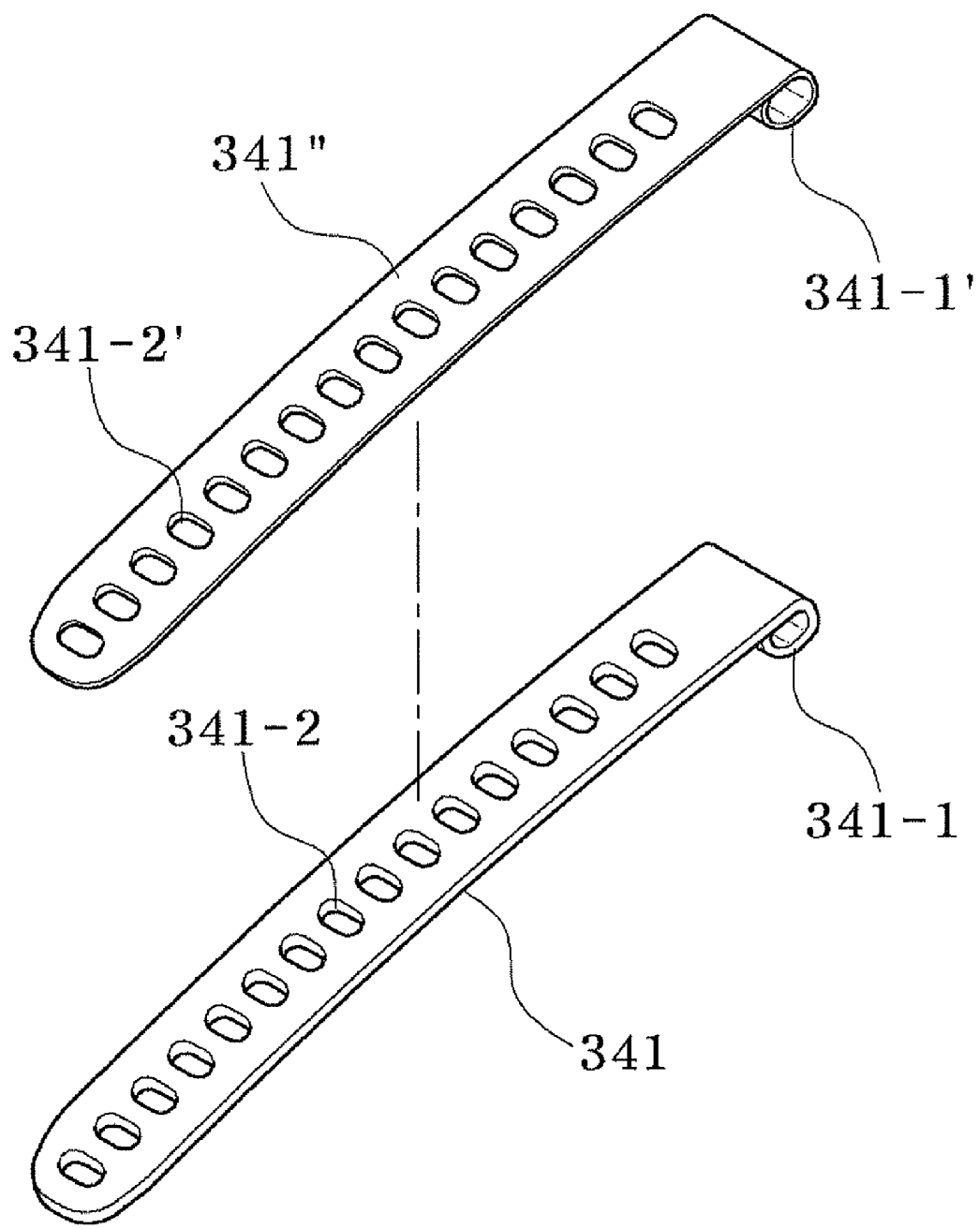
FIGS. 20A and 20B are exploded and assembled perspective views showing yet another exemplary structure of a length adjustment part applied to the embodiment of the present invention.
Figure 20B:
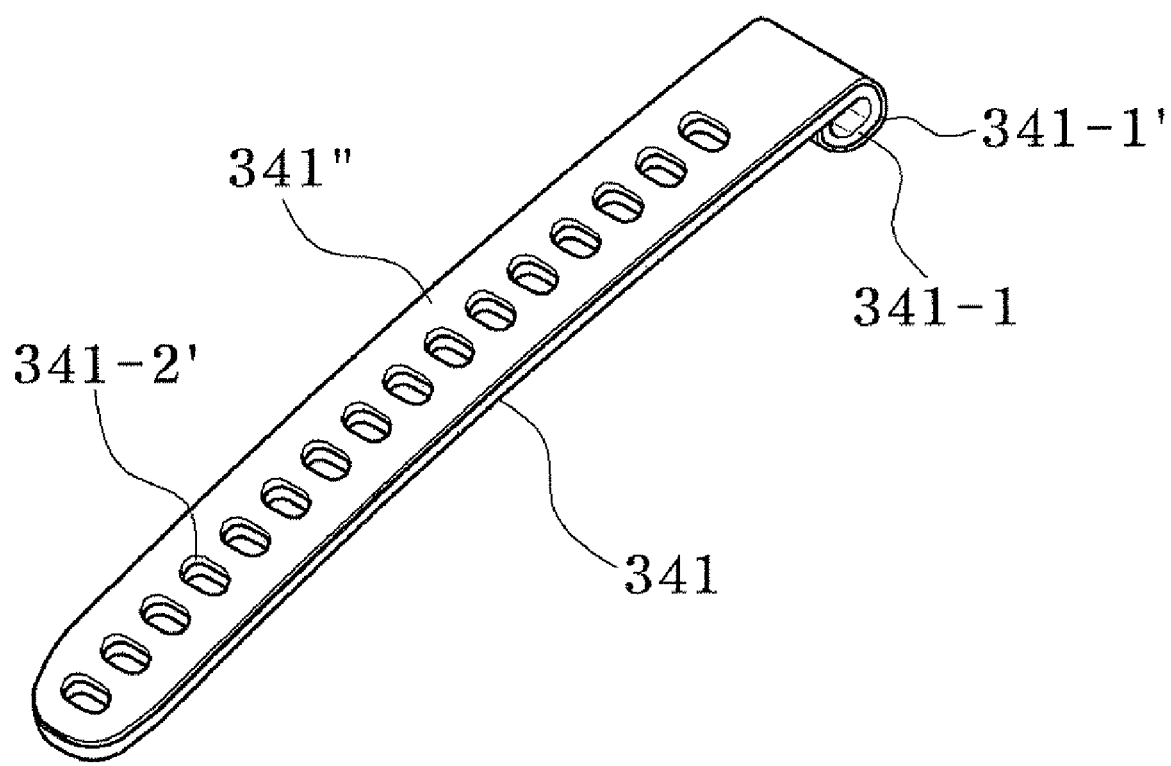

FIGS. 20A and 20B are exploded and assembled perspective views showing yet another exemplary structure of a length adjustment part applied to the embodiment of the present invention, showing constitution in which an auxiliary length adjustment part 341" is dually coupled to the length adjustment part 341 shown in FIGS. 12 to 16.

That is, the auxiliary length adjustment part 341" is formed of a thin steel plate having the same shape as the length adjustment part 341. A auxiliary fastening ring 341-1' is formed at one end of the auxiliary length adjustment part 341" to be coupled to the first connection ring 330*a*, and a plurality of length adjustment holes 341-2' are formed in a longitudinal direction of the auxiliary length adjustment part 341" at predetermined intervals.

The auxiliary length adjustment part 341" is securely fixed to an upper or lower surface of the length adjustment part 341 using a conventional fixing means (for example, a bolt and nut, welding, and so on) to effectively prevent the length adjustment part 341 from being broken and separated therefrom during high speed running and effectively reinforce strength of the length adjustment part 341.

In addition, the tensioning member 342 may include a mounting plate 342-1 in which the length adjustment part 341 is inserted and mounted; a second locking ring 342-2 fixedly formed at one end of the mounting plate 342-1 to be coupled to the second ring 330*b*; a pair of first and second support plates 342-3 and 342-3' vertically bent from both sides of the mounting plate 342-1 and parallelly aligned with each other; an insertion guide shaft 342-4 disposed under one ends of the first and second support plates 342-3 and 342-3' at its both ends and fixed at a predetermined height such that the other end of the length adjustment part 341 is slidably inserted; a first hinge shaft 342-5 fixedly coupled to one upper sides of the first and second support plates 342-3 and 342-3' at its both ends; a locking pivot pin 342-6 pivotally coupled to a center part of the first hinge shaft 342-5, and having a locking fixing piece 342-6*a* and a locking release piece 342-6*b* formed at its both ends to lock and release the length adjustment holes 341-2 when the length adjustment part 341 is inserted; a second hinge shaft 342-7 fixedly coupled to the other upper sides of the first and second support plates 342-3 and 342-3' at its both ends; and a spring 342-8 having a predetermined resilient force, pivotally coupled to one side of the second hinge shaft 342-7, one end of which is fixedly coupled to an outer side of the other end of the first support plate 342-3, and the other end of which resiliently supports an upper surface of the locking fixing piece 342-6*a* to resiliently maintain a state that the locking fixing pin 342-6*a* is locked by the length adjustment hole 341-2.

Additionally, the tensioning member may further include a cover 342-9 fixedly coupled to upper surfaces of the pair of first and second support plates 342-3 and 342-3', and a locking bolt 342-10 threadedly fastened to a threaded hole 342-9*a* formed at a center of the cover 342-9 to be in contact with an upper surface of the locking fixing piece 342-6*a* at its tip to prevent pivotal movement of the locking pivot pin 342-6 due to an external force (for example, pressure, vibrations, or the like).

In addition, a nut 342-12 may be further coupled to the locking bolt 342-10, and handle parts 342-12a project from an outer periphery of the nut 342-12 to allow a user to readily couple the nut to the locking bolt. The handle parts 342-12a may be formed at the outer periphery of the nut 342-12 to oppose each other.

Therefore, both the locking bolt 342-10 and the nut 342-12 are securely fixed to a threaded hole 342-9a formed at a center part of the cover 342-9 to effectively prevent the locking bolt 342-10 from loosening due to high speed running.

Here, the pair of first and second support plates 342-3 and 342-3' may be integrally coupled to the cover 342-9, but not limited thereto, may be securely coupled to the cover by a conventional fixing means (for example, adhesive, a screw, welding, or the like).

Moreover, the tensioning member may further include a locking piece 342-11 formed at a tip of the locking bolt 342-10 to prevent separation of the locking bolt 342-10 from the threaded hole 342-9a.

The fastener 300 applied to the embodiment of the present invention can be more conveniently attached and detached to/from the belt 200 to effectively adjust tension of the belt 200.

As shown in FIGS. 12 to 16, coupling between the fastener 300 and the belt 200 in accordance with an exemplary embodiment of the present invention is performed as follows. The first and second connection rings 330a and 330b are inserted into the insertion space parts 210a and 210b formed at both ends of the belt 200, and the first fastening ring 341-1 of the length adjustment part 341 and the second fastening ring 342-2 of the tensioning member 342 are coupled to the first and the second connection rings 330a and 330b. In this state, when the other end of the length adjustment part 341 is slidably inserted into a space between the mounting plate 342-1 and the insertion guide shaft 34204, the locking fixing piece 342-6a of the locking pivot pin 342-6 resiliently supported by the spring 342-8 is pushed by the other end of the length adjustment part 341 to be vertically moved with reference to the first hinge shaft 342-5 like a seesaw such that the plurality of length adjustment holes 341-2 are sequentially locked and released.

In addition, when the tension of the belt 200 is somewhat tightened, the locking fixing piece 342-6 is locked by the length adjustment hole 341-2 most adjacent to the locking fixing piece 342-6 to maintain tension of the belt 200.

Then, the locking bolt 342-10 fastened to the threaded hole 342-9a of the cover 342-9 is rotated in one direction (clockwise) such that the tip of the lock bolt 342-10 is in contact with an upper surface of the locking fixing piece 342-6a to lock the locking pivot pin 342-6, thereby effectively preventing the length adjustment part 341 from being separated from the tensioning member 342 during high speed running.

Meanwhile, when the fastener 340 is disassembled, first, the locking bolt 342-10 is rotated in the other direction (counterclockwise) such that the tip is spaced a certain gap from the upper surface of the locking fixing piece 342-6a to release the locking state of the locking pivot pin 342-6, and then, the locking release piece 342-6b of the locking pivot pin 342-6 is pushed by a predetermined pressure to release the locking fixing piece 342-6 from the length adjustment hole 341-2. In this state, the length adjustment part 341 is pulled to be entirely separated from the tensioning member 342.

When the anti-slipping device for dual tires in accordance with the present invention is installed to the dual tires, the insertion plate 110 of each spike member 100 is inserted into a space between the dual tires, and at the same time, the close-contact plates 120 are in close contact with surfaces of the dual tires 10. In this state, the first and second connection rings 330a and 330b of the fastener 300 are coupled to the insertion space parts 210a and 210b formed at both ends of the belt 200, and then, the length adjustment part 341 of the belt fastener 340 is inserted inside the tensioning member 342 to tightly maintain the tension of the belt 200.

In more detail, as shown in FIG. 1, in the state that the spike members 100 connected by the belt 200 are lengthwise rolled out on the road surface, one end of the belt 200 is put from the lower rear to the front of the dual tires, and then the insertion plate 110 of the spike member 100 is inserted between the dual tires and the close-contact plates 120 closely-contact the surfaces of the tires while the dual tires are wrapped with the spike members 100.

Next, the first and second connection rings 330a and 330b of the fastener 300 are coupled to the insertion space parts 210a and 210b of the belt 200, and then, the length adjustment part 341 of the belt fastener 340 is inserted inside the tensioning member 342 to tightly maintain the tension of the belt 200.

While the present invention has been described with reference to exemplary embodiments thereof, it will be understood by those skilled in the art that various changes and modifications in form and detail may be made therein without departing from the scope of the present invention as defined by the following claims.

What is claimed is:

1. An anti-slipping device for dual tires comprising:
a plurality of spike members which comprises an insertion plate bent in a trapezoidal shape to be inserted between the dual tires, and close-contact plates integrally and laterally extending from opposite sides of the insertion plate to contact each surface of the dual tires;
a belt connecting the insertion plates of the plurality of spike members to each other; and
a fastener coupled to opposite ends of the belt to adjust tension of the belt,
wherein the fastener includes first and second connection rings each inserted into insertion space parts formed at both ends of the belt, and a belt fastener detachably coupled to the first and second connection rings to adjust tension of the belt,
wherein the belt fastener comprises a length adjustment part having a first fastening ring at one end of the length of the adjustment part detachably coupled to the first connection ring, and a plurality of length adjustment holes formed in a longitudinal direction of the length adjustment part at predetermined intervals; and a tensioning member having a second fastening ring at one end of the tensioning member coupled to the second connection ring, such that the other end of the length adjustment part is slidably inserted inside the second fastening ring to sequentially lock or release the length adjustment holes using a predetermined resilient force to maintain tension of the belt.

2. The anti-slipping device according to claim 1, wherein the outer surface of the close-contact plate of the spike member is provided with at least one first recessed part having a straight shape to prevent the spike member from bending.

3. The anti-slipping device according to claim 1, wherein a plurality of first and second spikes protrude from an outer surface of each close-contact plate of the plurality of spike members at regular intervals to be different in height from each other.

4. The anti-slipping device according to claim 3, wherein the plurality of first spikes are lengthwise arranged on a middle of the close-contact plate at regular intervals, and comprises a hole penetrating the close-contact plate and a cylindrical projection integrally protruding from an outer circumference of the hole.

5. The anti-slipping device according to claim 4, wherein a top surface of the projection is formed with an uneven part having a saw-tooth shape for increasing friction with the road surface.

6. The anti-slipping device according to claim 3, wherein the plurality of second spikes are arranged in a zigzag pattern or a W-shape between the plurality of first spikes.

7. The anti-slipping device according to claim 3, wherein a protrusion further protrudes from an outer periphery of the close-contact plate.

8. The anti-slipping device according to claim 1, wherein the outer surface of the close-contact plate of the spike member is provided with at least one second recessed part formed in a straight shape to prevent the spike member from bending.

9. The anti-slipping device according to claim 1, wherein a pair of third recessed parts each having a V-shape protrude from opposite positions where the insertion plate and the close-contact plates of the spike member are connected, to prevent the spike member from bending.

10. The anti-slipping device according to claim 1, wherein a fourth recessed part further projects from an outer surface of the close-contact plate adjacent to a connection part of the insertion plate and the close-contact plate of each spike member to prevent damage to the spike member.

11. An anti-slipping device for dual tires comprising:
a plurality of spike members which comprises an insertion plate bent in a trapezoidal shape to be inserted between the dual tires, and close-contact plates integrally and laterally extending from opposite sides of the insertion plate to contact each surface of the dual tires;
a belt connecting the insertion plates of the plurality of spike members to each other; and
a fastener coupled to opposite ends of the belt to adjust tension of the belt,
wherein the fastener includes first and second connection rings each inserted into insertion space parts formed at both ends of the belt, and a belt fastener detachably coupled to the first and second connection rings to adjust tension of the belt,
wherein an auxiliary plate is further fixed to an inner surface of each spike member, wherein the auxiliary plate includes an insertion plate having the same shape as the spike member, and close-contact plates integrally extending from opposite sides of the insertion plate to contact each surface of the dual tires.

12. The anti-slipping device according to claim 1, wherein the length adjustment part has a predetermined radius of curvature.

13. The anti-slipping device according to claim 1, wherein the length adjustment part comprises a plurality of separated length adjustment members and a connection wire connected to the length adjustment members, wherein each length adjustment member has a plurality of length adjustment holes formed in a longitudinal direction thereof at predetermined intervals, and the connection wire is inserted into outer peripheries of the length adjustment members such that ends of the length adjustment members are in contact with each other.

14. The anti-slipping device according to claim 13, wherein a first length adjustment member installed at one end of the length adjustment part has a pair of first protrusions protruding from both long side surfaces of the length adjustment part, first connection holes are formed in the pair of first protrusions in a longitudinal direction of the length adjustment part to insert or extract the connection wire into or from the connection holes, and a first fastening ring is formed at one end of the length adjustment part to be coupled to the first connection ring, and
a second length adjustment member installed at the other end of the length adjustment part has a second protrusion protruding from an outer periphery of the second length adjustment part, and a second connection hole is formed in the second protrusion in a longitudinal direction thereof to insert or extract the connection wire into or from the second connection hole.

15. The anti-slipping device according to claim 14, wherein at least one third length adjustment member is further installed between the first and second length adjustment members,
wherein a pair of third protrusions project from both long side surfaces of the third length adjustment member, and third connection holes are formed in the pair of third protrusions in a longitudinal direction thereof to insert or extract the connection wire into or from the third connection holes.

16. The anti-slipping device according to claim 1, wherein the tensioning member comprises: a mounting plate in which the length adjustment part is inserted and mounted; a second locking ring fixedly formed at one end of the mounting plate to be detachably coupled to the second ring; a pair of first and second support plates vertically bent from both sides of the mounting plate and parallelly aligned with each other; an insertion guide shaft disposed under one ends of the first and second support plates at both ends of the insertion guide shaft and fixed at a predetermined height such that the other end of the length adjustment part is slidably inserted; a first hinge shaft fixedly coupled to one upper sides of the first and second support plates at both ends of the first hinge shaft; a locking pivot pin pivotally coupled to a center part of the first hinge shaft, and having a locking fixing piece and a locking release piece formed at both ends of the locking pivot pin to lock and release the length adjustment holes when the length adjustment pad is inserted; a second hinge shaft fixedly coupled to the other upper sides of the first and second support plates at both ends of the second hinge shaft; and a spring having a predetermined resilient force, pivotally coupled to one side of the second hinge shaft, one end of which is fixedly coupled to an outer side of the other end of the first support plate, and the other end of which resiliently supports an upper surface of the locking fixing piece is locked by the length adjustment hole.

17. The anti-slipping device according to claim 16, wherein the tensioning member further comprises a cover fixedly coupled to upper surfaces of the pair of first and second support plates, and a locking bolt threadedly fastened to a threaded hole formed at a center of the cover to be in contact with an upper surface of the locking fixing piece at a tip of the locking bolt to prevent pivotal movement of the locking pivot pin due to an external force.

18. The anti-slipping device according to claim 17, wherein the tensioning member further comprises a locking piece formed at the tip of the locking bolt to prevent separation of the locking bolt from the threaded hole.

* * * * *

UNITED STATES PATENT AND TRADEMARK OFFICE
CERTIFICATE OF CORRECTION

| | | |
|---|---|---|
| PATENT NO. | : 7,712,497 B2 | Page 1 of 1 |
| APPLICATION NO. | : 12/113498 | |
| DATED | : May 11, 2010 | |
| INVENTOR(S) | : Shin | |

It is certified that error appears in the above-identified patent and that said Letters Patent is hereby corrected as shown below:

Column 14, Line 43, Claim 16, "pad is" should read -- part is --

Signed and Sealed this

Twenty-eighth Day of September, 2010

David J. Kappos
*Director of the United States Patent and Trademark Office*